(12) United States Patent
Hawkins et al.

(10) Patent No.: US 9,551,588 B2
(45) Date of Patent: Jan. 24, 2017

(54) METHODS AND SYSTEMS TO DETERMINE CONSUMER LOCATIONS BASED ON NAVIGATIONAL VOICE CUES

(71) Applicant: The Nielsen Company (US), LLC, Schaumburg, IL (US)

(72) Inventors: Ameyon R. Hawkins, Oldsmar, FL (US); Jan Besehanic, Tampa, FL (US); Jeremy T. Satterly, Oldsmar, FL (US); Jibri Duncan, Oldsmar, FL (US)

(73) Assignee: THE NIELSEN COMPANY, LLC, New York, NY (US)

( * ) Notice: Subject to any disclaimer, the term of this patent is extended or adjusted under 35 U.S.C. 154(b) by 0 days.

(21) Appl. No.: 14/473,318

(22) Filed: Aug. 29, 2014

(65) Prior Publication Data

US 2016/0061621 A1    Mar. 3, 2016

(51) Int. Cl.
*G10L 15/26* (2006.01)
*G06Q 30/02* (2012.01)
*G01C 21/36* (2006.01)

(52) U.S. Cl.
CPC ....... *G01C 21/3629* (2013.01); *G01C 21/3697* (2013.01); *G10L 15/265* (2013.01); *G06Q 30/0261* (2013.01); *G06Q 30/0266* (2013.01)

(58) Field of Classification Search
CPC .................................. G01C 21/3608
See application file for complete search history.

(56) References Cited

U.S. PATENT DOCUMENTS

| 4,623,230 A | 11/1986 | Weinblatt |
| 4,698,781 A | 10/1987 | Cockerell, Jr. |
| 4,703,444 A | 10/1987 | Storms, Jr. et al. |
| 4,718,106 A | 1/1988 | Weinblatt |
| 4,722,054 A | 1/1988 | Yorozu et al. |
| 4,751,512 A | 6/1988 | Longaker |
| 4,804,937 A | 2/1989 | Barbiaux et al. |
| 4,812,980 A | 3/1989 | Yamada et al. |
| 4,858,000 A | 8/1989 | Lu |
| 4,905,080 A | 2/1990 | Watanabe et al. |
| 4,930,011 A | 5/1990 | Kiewit |

(Continued)

FOREIGN PATENT DOCUMENTS

| AU | 199731160 | 11/1997 |
| AU | 699910 | 1/1998 |

(Continued)

OTHER PUBLICATIONS

Battelle Transportation Division. "Global Positioning Systems for Personal Travel Surveys: Lexington Area Travel Data Collection Test," Sep. 15, 1997, 92 pages.

(Continued)

*Primary Examiner* — Todd Melton
(74) *Attorney, Agent, or Firm* — Hanley, Flight & Zimmerman, LLC

(57) ABSTRACT

Methods and systems to determine consumer locations based on navigational voice cues are disclosed. An example method includes identifying, with a processor, a route point designated by a navigational voice cue output by a navigation system providing directions to an operator of a vehicle. The example method also includes determining, with the processor, at least one of a location or an anticipated location of an occupant of the vehicle based on the route point.

28 Claims, 6 Drawing Sheets

(56) References Cited

U.S. PATENT DOCUMENTS

| | | |
|---|---|---|
| 4,967,209 A | 10/1990 | Hasegawa et al. |
| 4,977,509 A | 12/1990 | Pitchford et al. |
| 4,982,346 A | 1/1991 | Girouard et al. |
| 4,989,151 A | 1/1991 | Nuimura |
| 4,994,974 A | 2/1991 | Cummings |
| 5,014,206 A | 5/1991 | Scribner et al. |
| 5,019,828 A | 5/1991 | Schoolman |
| 5,023,929 A | 6/1991 | Call |
| 5,045,861 A | 9/1991 | Duffett-Smith |
| 5,059,970 A | 10/1991 | Raubenheimer et al. |
| 5,068,656 A | 11/1991 | Sutherland |
| 5,072,380 A | 12/1991 | Randelman et al. |
| 5,097,981 A | 3/1992 | Degasperi et al. |
| 5,121,915 A | 6/1992 | Duncan et al. |
| 5,133,081 A | 7/1992 | Mayo |
| 5,142,278 A | 8/1992 | Moallemi et al. |
| 5,159,556 A | 10/1992 | Schorter |
| 5,182,555 A | 1/1993 | Sumner |
| 5,184,314 A | 2/1993 | Kelly et al. |
| 5,214,757 A | 5/1993 | Mauney et al. |
| 5,218,188 A | 6/1993 | Hanson |
| 5,235,633 A | 8/1993 | Dennison et al. |
| 5,245,694 A | 9/1993 | Zwern |
| 5,309,174 A | 5/1994 | Minkus |
| 5,313,200 A | 5/1994 | Sone |
| 5,331,544 A | 7/1994 | Lu et al. |
| 5,334,974 A | 8/1994 | Simms et al. |
| 5,359,529 A | 10/1994 | Snider |
| 5,373,315 A | 12/1994 | Dufresne et al. |
| 5,382,970 A | 1/1995 | Kiefl |
| 5,382,983 A | 1/1995 | Kwoh et al. |
| 5,389,934 A | 2/1995 | Kass |
| 5,394,333 A | 2/1995 | Kao |
| 5,394,461 A | 2/1995 | Garland |
| 5,398,190 A | 3/1995 | Wortham |
| 5,406,271 A | 4/1995 | Sonnendorfer et al. |
| 5,410,724 A | 4/1995 | Worthy |
| 5,412,416 A | 5/1995 | Nemirofsky |
| 5,412,573 A | 5/1995 | Barnea et al. |
| 5,414,432 A | 5/1995 | Penny, Jr. et al. |
| 5,432,841 A | 7/1995 | Rimer |
| 5,444,769 A | 8/1995 | Koen et al. |
| 5,457,807 A | 10/1995 | Weinblatt |
| 5,465,038 A | 11/1995 | Register |
| 5,465,115 A | 11/1995 | Conrad et al. |
| 5,481,294 A | 1/1996 | Thomas et al. |
| 5,483,276 A | 1/1996 | Brooks et al. |
| 5,490,060 A | 2/1996 | Malec et al. |
| 5,504,482 A | 4/1996 | Schreder |
| 5,504,589 A | 4/1996 | Montague et al. |
| 5,510,828 A | 4/1996 | Lutterbach et al. |
| 5,515,270 A | 5/1996 | Weinblatt |
| 5,524,081 A | 6/1996 | Paul |
| 5,526,357 A | 6/1996 | Jandrell |
| 5,528,248 A | 6/1996 | Steiner et al. |
| 5,539,395 A | 7/1996 | Buss et al. |
| 5,557,268 A | 9/1996 | Hughes et al. |
| 5,557,524 A | 9/1996 | Maki |
| 5,559,520 A | 9/1996 | Barzegar et al. |
| 5,561,704 A | 10/1996 | Salimando |
| 5,566,226 A | 10/1996 | Mizoguchi et al. |
| 5,579,124 A | 11/1996 | Aijala et al. |
| 5,581,800 A | 12/1996 | Fardeau et al. |
| 5,589,838 A | 12/1996 | McEwan |
| 5,592,181 A | 1/1997 | Cai et al. |
| 5,621,793 A | 4/1997 | Bednarek et al. |
| 5,629,739 A | 5/1997 | Dougherty |
| 5,636,245 A | 6/1997 | Ernst et al. |
| 5,638,077 A | 6/1997 | Martin |
| 5,691,980 A | 11/1997 | Welles, II et al. |
| 5,694,335 A | 12/1997 | Hollenberg |
| 5,699,244 A | 12/1997 | Clark, Jr. et al. |
| 5,710,884 A | 1/1998 | Dedrick |
| 5,740,035 A | 4/1998 | Cohen et al. |
| 5,802,492 A | 9/1998 | DeLorme et al. |
| 5,812,069 A | 9/1998 | Albrecht et al. |
| 5,812,959 A | 9/1998 | Froeburg et al. |
| 5,815,114 A | 9/1998 | Speasl et al. |
| 5,822,692 A | 10/1998 | Krishan et al. |
| 5,825,283 A | 10/1998 | Camhi |
| 5,826,164 A | 10/1998 | Weinblatt |
| 5,848,129 A | 12/1998 | Baker |
| 5,850,249 A | 12/1998 | Massetti et al. |
| 5,872,588 A | 2/1999 | Aras et al. |
| 5,881,360 A | 3/1999 | Fong |
| 5,890,068 A | 3/1999 | Fattouche et al. |
| 5,898,384 A | 4/1999 | Alt et al. |
| 5,901,171 A | 5/1999 | Kohli et al. |
| 5,918,223 A | 6/1999 | Blum et al. |
| 5,923,252 A | 7/1999 | Sizer et al. |
| 5,952,958 A | 9/1999 | Speasl et al. |
| 5,953,055 A | 9/1999 | Huang et al. |
| 5,973,732 A | 10/1999 | Guthrie |
| 5,974,396 A | 10/1999 | Anderson et al. |
| 5,983,069 A | 11/1999 | Cho et al. |
| 5,984,182 A | 11/1999 | Murrah et al. |
| 5,995,015 A | 11/1999 | DeTemple et al. |
| 6,005,490 A | 12/1999 | Higashihara |
| 6,006,148 A | 12/1999 | Strong |
| 6,021,371 A | 2/2000 | Fultz |
| 6,041,280 A | 3/2000 | Kohli et al. |
| 6,091,956 A | 7/2000 | Hollenberg |
| 6,097,441 A | 8/2000 | Allport |
| 6,098,048 A | 8/2000 | Dashefsky et al. |
| 6,125,325 A | 9/2000 | Kohli |
| 6,157,413 A | 12/2000 | Hanafee et al. |
| 6,169,955 B1 | 1/2001 | Fultz |
| 6,236,937 B1 | 5/2001 | Kohli |
| 6,246,948 B1 | 6/2001 | Thakker |
| 6,252,522 B1 | 6/2001 | Hampton et al. |
| 6,295,092 B1 | 9/2001 | Hullinger et al. |
| 6,327,619 B1 | 12/2001 | Blumenau |
| 6,353,929 B1 | 3/2002 | Houston |
| 6,381,748 B1 | 4/2002 | Lin et al. |
| 6,393,046 B1 | 5/2002 | Kohli et al. |
| 6,397,041 B1 | 5/2002 | Ballard et al. |
| 6,400,753 B1 | 6/2002 | Kohli et al. |
| 6,405,370 B1 | 6/2002 | Jarrell |
| 6,421,609 B2 | 7/2002 | Kohli |
| 6,466,971 B1 | 10/2002 | Humpleman et al. |
| 6,467,089 B1 | 10/2002 | Aust et al. |
| 6,480,783 B1 | 11/2002 | Myr |
| 6,530,082 B1 | 3/2003 | Del Sesto et al. |
| 6,531,982 B1 | 3/2003 | White et al. |
| 6,546,419 B1 | 4/2003 | Humpleman et al. |
| 6,574,558 B2 | 6/2003 | Kohli |
| 6,577,713 B1 | 6/2003 | Peterson et al. |
| 6,615,130 B2 | 9/2003 | Myr |
| 6,629,029 B1 | 9/2003 | Giles |
| 6,647,548 B1 | 11/2003 | Lu et al. |
| 6,650,997 B2 | 11/2003 | Funk |
| 6,697,104 B1 | 2/2004 | Yakobi et al. |
| 6,745,011 B1 | 6/2004 | Hendrickson et al. |
| 6,754,470 B2 | 6/2004 | Hendrickson et al. |
| 6,772,129 B2 | 8/2004 | Alvarez et al. |
| 6,853,904 B2 | 2/2005 | Matsuo et al. |
| 6,904,461 B1 | 6/2005 | Randhava et al. |
| 6,934,508 B2 | 8/2005 | Ceresoli et al. |
| 6,970,131 B2 | 11/2005 | Percy et al. |
| 6,970,698 B2 | 11/2005 | Majmundar et al. |
| 7,038,619 B2 | 5/2006 | Percy et al. |
| 7,092,964 B1 | 8/2006 | Dougherty et al. |
| 7,155,336 B2 | 12/2006 | Dorfman et al. |
| 7,176,834 B2 | 2/2007 | Percy et al. |
| 7,209,831 B2 | 4/2007 | Hilliard et al. |
| 7,215,280 B1 | 5/2007 | Percy et al. |
| 7,222,071 B2 | 5/2007 | Neuhauser et al. |
| 7,359,687 B2 | 4/2008 | Ceresoli et al. |
| 7,379,778 B2 | 5/2008 | Hayes et al. |
| 7,408,502 B2 | 8/2008 | Percy et al. |
| 7,586,439 B2 | 9/2009 | Percy et al. |
| 7,587,732 B2 | 9/2009 | Wright et al. |
| 7,894,703 B2 | 2/2011 | Lapstun et al. |
| 7,917,130 B1 | 3/2011 | Christensen et al. |

(56) References Cited

U.S. PATENT DOCUMENTS

| | | | |
|---|---|---|---|
| 7,962,315 B2 | 6/2011 | Jensen et al. | |
| 8,078,468 B2* | 12/2011 | Andreasson | G06Q 30/02 704/257 |
| 8,239,129 B2* | 8/2012 | Shen | G10L 15/1815 340/995.17 |
| 8,245,249 B2 | 8/2012 | Lee | |
| 8,462,048 B2 | 6/2013 | Percy et al. | |
| 8,539,527 B2 | 9/2013 | Wright et al. | |
| 8,549,552 B2 | 10/2013 | Ramaswamy et al. | |
| 8,572,640 B2 | 10/2013 | Kolessar | |
| 8,577,685 B2* | 11/2013 | Morrison | G10L 15/265 704/270 |
| 8,612,226 B1* | 12/2013 | Epstein | G06Q 30/0241 704/251 |
| 8,649,610 B2 | 2/2014 | Hicks | |
| 8,798,995 B1* | 8/2014 | Edara | G06Q 30/0255 704/211 |
| 2001/0007149 A1 | 7/2001 | Smith | |
| 2001/0037232 A1 | 11/2001 | Miller | |
| 2001/0049620 A1 | 12/2001 | Blasko | |
| 2002/0010919 A1 | 1/2002 | Lu et al. | |
| 2002/0015574 A1 | 2/2002 | Suito et al. | |
| 2002/0056089 A1 | 5/2002 | Houston | |
| 2002/0059218 A1 | 5/2002 | August et al. | |
| 2002/0097193 A1 | 7/2002 | Powers | |
| 2002/0102908 A1 | 8/2002 | Chan | |
| 2002/0112048 A1 | 8/2002 | Gruyer et al. | |
| 2002/0129360 A1 | 9/2002 | Lee | |
| 2002/0133393 A1 | 9/2002 | Tatsumi et al. | |
| 2002/0133412 A1 | 9/2002 | Oliver et al. | |
| 2002/0198762 A1 | 12/2002 | Donato | |
| 2003/0005430 A1 | 1/2003 | Kolessar | |
| 2003/0005433 A1 | 1/2003 | Janik et al. | |
| 2003/0018977 A1 | 1/2003 | McKenna | |
| 2003/0041141 A1 | 2/2003 | Abdelaziz et al. | |
| 2003/0045301 A1 | 3/2003 | Wollrab | |
| 2003/0045955 A1 | 3/2003 | Janik | |
| 2003/0122708 A1 | 7/2003 | Percy et al. | |
| 2003/0131350 A1 | 7/2003 | Peiffer et al. | |
| 2003/0133412 A1 | 7/2003 | Iyer et al. | |
| 2003/0170001 A1 | 9/2003 | Breen | |
| 2003/0171833 A1 | 9/2003 | Crystal et al. | |
| 2003/0177488 A1 | 9/2003 | Smith et al. | |
| 2004/0027271 A1 | 2/2004 | Schuster et al. | |
| 2004/0080452 A1 | 4/2004 | Percy et al. | |
| 2004/0110515 A1 | 6/2004 | Blumberg et al. | |
| 2004/0111738 A1 | 6/2004 | Gunzinger | |
| 2004/0133480 A1 | 7/2004 | Domes | |
| 2004/0193492 A1 | 9/2004 | Applebaum | |
| 2005/0035857 A1 | 2/2005 | Zhang et al. | |
| 2005/0144632 A1 | 6/2005 | Mears et al. | |
| 2005/0149398 A1 | 7/2005 | McKay | |
| 2005/0204379 A1 | 9/2005 | Yamamori | |
| 2005/0243784 A1 | 11/2005 | Fitzgerald et al. | |
| 2006/0053110 A1 | 3/2006 | McDonald et al. | |
| 2006/0075111 A1 | 4/2006 | Auryan et al. | |
| 2006/0145916 A1 | 7/2006 | Percy et al. | |
| 2006/0173859 A1* | 8/2006 | Kim | G06F 17/30038 |
| 2006/0208946 A1 | 9/2006 | Bailey et al. | |
| 2007/0006250 A1 | 1/2007 | Croy et al. | |
| 2007/0011040 A1 | 1/2007 | Wright et al. | |
| 2007/0055987 A1 | 3/2007 | Lu et al. | |
| 2007/0156324 A1 | 7/2007 | Percy et al. | |
| 2007/0234213 A1* | 10/2007 | Krikorian | H04N 21/23406 715/716 |
| 2007/0242839 A1 | 10/2007 | Kim et al. | |
| 2007/0249216 A1 | 10/2007 | Cheng | |
| 2007/0257816 A1 | 11/2007 | Lyle et al. | |
| 2008/0021741 A1 | 1/2008 | Holla et al. | |
| 2008/0133291 A1 | 6/2008 | Nasser et al. | |
| 2008/0140479 A1 | 6/2008 | Mello et al. | |
| 2008/0177695 A1 | 7/2008 | Nasser et al. | |
| 2008/0191934 A1 | 8/2008 | Baker et al. | |
| 2008/0243573 A1 | 10/2008 | Nasser et al. | |
| 2008/0246657 A1 | 10/2008 | Percy et al. | |
| 2009/0073035 A1 | 3/2009 | Percy et al. | |
| 2009/0076637 A1 | 3/2009 | Kameyama | |
| 2009/0077578 A1 | 3/2009 | Steuer et al. | |
| 2009/0089065 A1 | 4/2009 | Buck et al. | |
| 2009/0132072 A1 | 5/2009 | Angus | |
| 2009/0180638 A1 | 7/2009 | Hsu et al. | |
| 2009/0257620 A1 | 10/2009 | Hicks | |
| 2009/0300669 A1 | 12/2009 | Wright et al. | |
| 2010/0074239 A1 | 3/2010 | Born | |
| 2010/0082245 A1 | 4/2010 | Patenaude et al. | |
| 2010/0312369 A1 | 12/2010 | Dollar, Jr. | |
| 2011/0103595 A1 | 5/2011 | Ramaswamy et al. | |
| 2011/0172989 A1* | 7/2011 | Moraes | G06Q 10/107 704/9 |
| 2011/0320273 A1* | 12/2011 | Miranda-Steiner | G06Q 30/02 705/14.49 |
| 2012/0078508 A1* | 3/2012 | Ellanti | G01C 21/362 701/419 |
| 2012/0303267 A1* | 11/2012 | Shen | G10L 15/1815 701/427 |
| 2013/0204669 A1 | 8/2013 | Percy et al. | |
| 2013/0262126 A1* | 10/2013 | Schalk | G01C 21/26 704/275 |
| 2013/0314281 A1 | 11/2013 | Percy et al. | |
| 2014/0058666 A1 | 2/2014 | Sheha et al. | |
| 2015/0032597 A1 | 1/2015 | Percy et al. | |
| 2015/0088640 A1* | 3/2015 | Wright | G06Q 30/0251 705/14.49 |
| 2015/0163561 A1* | 6/2015 | Grevers, Jr. | H04N 21/812 704/235 |
| 2015/0178750 A1* | 6/2015 | Robinson | G06Q 30/0268 705/7.34 |
| 2015/0221015 A1* | 8/2015 | Laha | G06Q 30/0641 705/26.7 |
| 2015/0379989 A1* | 12/2015 | Balasubramanian | G06Q 30/0255 704/233 |

FOREIGN PATENT DOCUMENTS

| | | |
|---|---|---|
| CA | 2229238 | 11/1999 |
| EP | 0275328 | 7/1988 |
| EP | 0425347 | 5/1991 |
| EP | 0683451 | 11/1995 |
| EP | 0697773 | 2/1996 |
| EP | 0713335 | 5/1996 |
| EP | 0813716 | 12/1997 |
| EP | 1213860 | 6/2002 |
| EP | 0895599 | 7/2002 |
| EP | 1026847 | 8/2002 |
| EP | 0731339 | 11/2002 |
| EP | 1453286 | 9/2004 |
| JP | 2000307530 | 11/2000 |
| JP | 2002051274 | 2/2002 |
| WO | 98/10539 | 3/1998 |
| WO | 0245273 | 6/2002 |
| WO | 03095945 | 11/2003 |
| WO | 2005019853 | 3/2005 |
| WO | 2005038625 | 4/2005 |
| WO | 2006015188 | 2/2006 |
| WO | 2006015339 | 2/2006 |
| WO | 2006058274 | 6/2006 |

OTHER PUBLICATIONS

Bernstein et al., "An Introduction to Map Matching for Personal Navigation Assistants," Princeton University, New Jersey Tide Center, Aug. 1996, 17 pages.

Bizcommunity.com, "Nielsen to Test Electronic Ratings for Outdoor Advertising," Oct. 9, 2002 (6 pages), www.biz-community.com/Article/198/19/1181.hlml.

Robinson, Phillip. "Global Positioning helps keep travelers on course (Originated from Knight-Ridder Newspapers)," Knight Ridder/ Tribute News Service. Jun. 4, 1997, retrieved Jan. 23, 2007, 3 pages.

(56) References Cited

OTHER PUBLICATIONS

White et al., "Some map matching algorithms for personal navigation assistants" Transportation Research Part C 8 (2000) 91-108, 18 pages.

\* cited by examiner

METHODS AND SYSTEMS TO DETERMINE CONSUMER LOCATIONS BASED ON NAVIGATIONAL VOICE CUES

FIELD OF THE DISCLOSURE

This disclosure relates generally to consumer monitoring, and, more particularly, to methods and systems to determine consumer locations based on navigational voice cues.

BACKGROUND

With the development of the global positioning system (GPS), many individuals rely on navigation systems to direct them while driving. Such navigation systems may be built directly into a vehicle, may be manufactured as a standalone device, or may be incorporated into a multifunction device (e.g., a smartphone). Some navigation systems provide voiceover instructions or verbal cues to guide individuals on when and where to turn, and on what roads, to arrive at a pre-selected destination.

DETAILED DESCRIPTION

Figure 1:
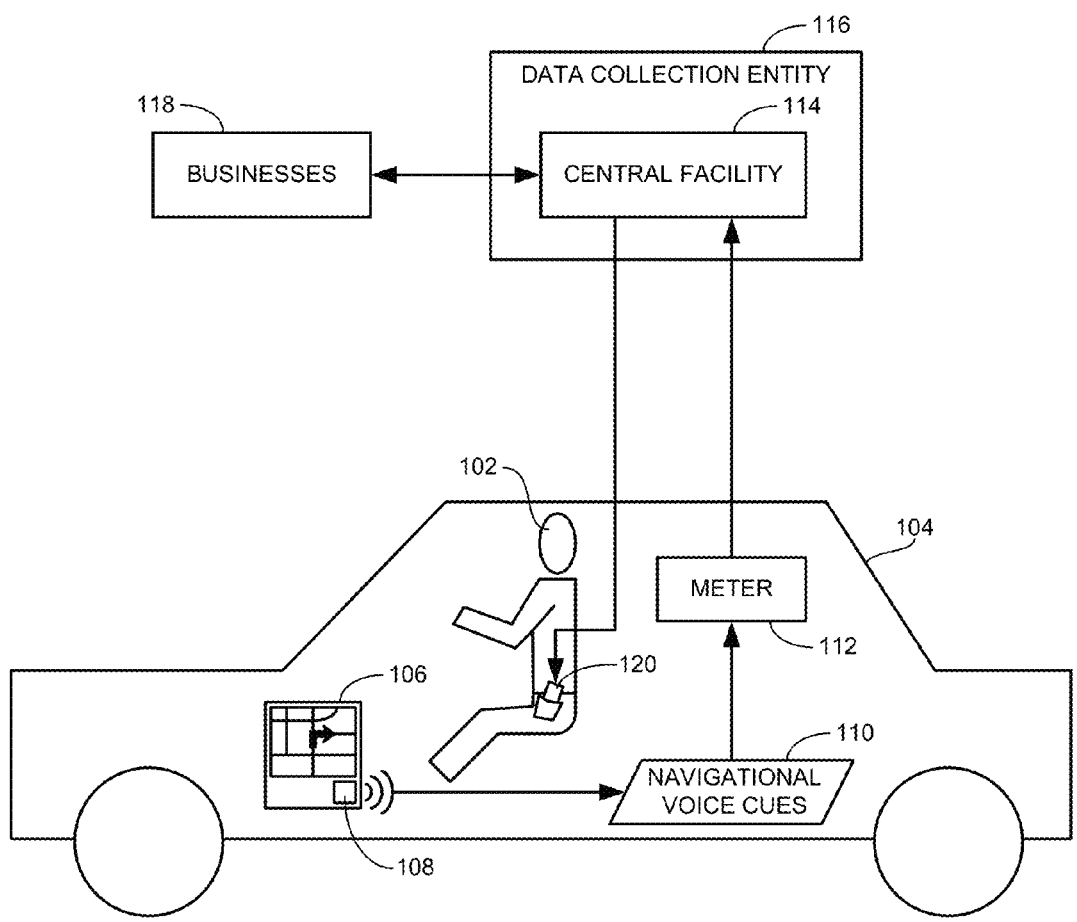
FIG. 1 is a diagram of an example system shown in an example environment in which the teachings disclosed herein may be implemented.

Many businesses (e.g., manufacturers, retailers, etc.) and advertisers try to increase demand for their products or services by influencing the behavior of target consumer segments through advertising campaigns. Often businesses will try to improve their marketing efforts by targeting specific consumer segments based on one or more demographic characteristics. In some instances, the success of a particular advertisement to which consumers are exposed may depend on the circumstances of the consumers and the timing of the exposure to the advertisement. For example, if consumers are located in proximity to a business and/or are heading towards the business at the time that the consumers are exposed to an advertisement or promotional offer from the business, the consumers may be more likely to favorably respond to the advertisement. Accordingly, there is a desire to determine where potential consumers are located and/or heading and to provide them with advertisements that are associated with their location in substantially real time.

Navigation systems that use GPS are widely used by many individuals to enable them to determine where they are located and/or to provide directions to locations where they want to go. Frequently, such directions are provided in the form of verbal instructions or voice cues that identify when and where a driver is to turn to arrive at a desired destination. For example, navigational voice cues typically identify upcoming points along a route (e.g., intersections) at which a driver is to take some action (e.g., turn, continuing along the current road, etc.). More particularly, navigational voice cues often give navigation information corresponding to one or more of (1) a distance to the next route point (e.g., intersection or road) where a driver is to perform a turn or take some other action (e.g., keep right at a fork, exit on a ramp, continue on the current road, etc.), (2) the direction of the action to be taken (e.g., turn left, veer right, head west, etc.), and (3) the name of the route point (e.g., intersection or road) where the action is taken. If a driver passes a route point (e.g., an intersection) without following the verbal directions or takes some turn before reaching the verbally identified route point, the navigation system will typically determine a new route to the ultimate destination (e.g., a destination entered into the navigation system as the final location and/or waypoint to be reached). To signal the change of route, many navigation systems provide a voice cue indicating that the route to the ultimate destination is being recalculated. Once the navigation system determines the new route, another voice cue may be provided that defines the new directions (e.g., identifies the next action to take and/or an upcoming route point where an action is to be taken).

As used herein, the term "road" is hereby defined to include any road, street, highway, freeway, avenue, boulevard, path, route, expressway, toll way, on ramp, off ramp, alleyway, and/or other passageway designated for vehicular travel. A road will typically be identified in an up to date database of a navigation system. As used herein, the term "intersection" is hereby defined to include any point in a road at which a vehicle may take more than one route (e.g., two or more cross-streets, an off-ramp, an on-ramp, etc.) and/or where a road changes name or direction such that a navigational voice cue might be given. Thus, as used herein, references to an intersection necessarily involve reference to at least one road. Further, while "intersection" includes a point where two roads cross, the term also includes locations where a single road may fork such that a vehicle can continue straight or veer to the left or right (e.g., an off ramp from a main road). Furthermore, "intersection" includes the location where a name of a single road changes to a different name (whether or not there is a physical change in the road).

Examples disclosed herein rely on the route points (e.g., intersections, roads, etc.) and/or other navigation information designated in the navigational voice cues to determine the location of a potential consumer and/or the anticipated location of the consumer based on the navigational directions provided by the navigation system. Using this location information, advertisements that are targeted for a particular area can be provided to the consumer when the location and/or anticipated location of the consumer falls within the target area for the advertisement. In this manner, a business is able to provide an advertisement promoting a good or service to a consumer when the consumer is in the area and the consumer is able to learn of the promotional offer(s) when in the area. Furthermore, examples disclosed herein impose little intrusion on the privacy interests of the consumer because the consumer's location cannot be precisely pinpointed as it would be if the location was determined directly through GPS tracking. Examples disclosed herein determine location based on navigational voice cues and, thus, only approximate the location of consumer(s) with periodic updates. Accordingly, consumer(s) may be more willing to participate in such a marketing scheme to be tracked in this manner.

Additionally or alternatively, some examples disclosed herein rely on the route points (e.g., intersections, roads, and/or other navigation information designated in the navigational voice cues to determine the travel path followed by a potential consumer. Using this information, outdoor advertisement(s) (e.g., billboards) that are located at a known location can be compared to the travel path of the consumer to determine whether the consumer was exposed to the outdoor advertisement(s). In some examples, the exposure metrics from multiple consumers may be aggregated to estimate a reach of the outdoor advertisement(s) to inform business(es) of the benefit of outdoor advertisement marketing campaign(s).

Example methods disclosed herein include identifying, with a processor, a route point designated by a navigational voice cue output by a navigation system providing directions to an operator of a vehicle. Example methods also include determining, with the processor, at least one of a location or an anticipated location of an occupant of the vehicle based on the route point.

Example systems disclosed herein include an interface to receive in-vehicle audio data corresponding to audio output by a navigation system directing a user within a vehicle. The in-vehicle audio data includes a navigational voice cue. Example systems also include a speech analyzer to identify a route point from the navigational voice cue. Example systems further include a location determiner to determine at least one of a location or an anticipated location of the user based on the route point.

FIG. 1 is a diagram of an example system shown in an example environment of use. As shown in the illustrated example, a person 102 is driving in a vehicle 104. In some examples, the person 102 is the driver of the vehicle 104. In other examples, the person 102 is a passenger in the vehicle 104. In some examples, the person 102 is a potential consumer of goods or services provided by one or more businesses 118. As such, the business(es) 118 may desire to reach out to the person 102 through an advertisement and/or an advertising campaign (e.g., multiple advertisements presented over time) to try and influence the person 102 to purchase one or more goods and/or services. The person 102 may desire to be made aware of promotional offers or sales from the business(es) 118 to take advantage of the good(s) and/or service(s) being offered for sale. Additionally or alternatively, the business(es) 118 may desire to monitor or track the behavior of the person 102 to assess the effectiveness and/or reach of particular outdoor advertisement(s). As such, in some examples, the person 102 is a panelist having consented to having their location being tracked or monitored by a data collection entity 116. Panelists are users registered on panels maintained by a research entity (e.g., an audience measurement company, an advertising entity, etc.) that owns and/or operates the data collecting facility 114. In some examples, the data collection entity 116 may be an audience measurement entity cooperating with an advertising entity. Alternatively, in some examples, the entity 116 may be an advertising entity. In some examples, as part of the process for people to become a panelist, they provide demographic information and/or other personal information (e.g., preferences, interests, etc.) to the data collection entity 116.

In the illustrated example of FIG. 1, an example navigation system 106 is located within the vehicle 104. In some examples, the navigation system 106 is implemented using the global position system (GPS) to determine the location of the navigation system 106 and provide directions to navigate the vehicle 104 to some desired location. In some examples, the navigation system 106 is manufactured with and/or installed (e.g., affixed) in the vehicle 104. In some examples, the navigation system 106 is a standalone portable device that may be placed inside the vehicle 104. In some examples, the navigation system 106 is incorporated into a multifunction portable device, such as a smartphone. In the illustrated example, the navigation system 106 includes a speaker 108 through which navigational voice prompts or cues 110 are emitted to provide audible directions to a driver (e.g., the person 102) of the vehicle 104.

In the illustrated example of FIG. 1, a meter 112 is disposed within the vehicle 104 to detect and/or capture audible noises inside the vehicle (referred to herein as in-vehicle audio data) that includes the navigational voice cues 110. As used herein, in-vehicle audio data refers to sounds that may be heard within the cabin of the vehicle where the driver is present during vehicular operation. In some examples, the navigational voice cues 110 are detected and analyzed to generate navigation information indicative of the location and route taken by the vehicle 104. In some examples, the meter 112 is adapted from a portable metering device as described in U.S. Provisional Application Ser. No. 60/511,859, U.S. Provisional Application Ser. No. 60/578,196; U.S. Pat. Nos. 7,587,732; 8,539,527; 8,806,535; and U.S. patent application Ser. No. 14/448,715; all of which are hereby incorporated herein by reference in their entireties. In some examples, the meter 112 is adapted from a metering device as described in U.S. Pat. No. 8,549,552, and U.S. Re-Issue patent application Ser. No. 14/260,890, which are hereby incorporated herein by reference in their entireties. Briefly, such an example meter detects media to monitor exposure of the occupants of the vehicle 104 to media for purposes of audience measurement. In such examples, the detected media may be audio media playing over the radio, audio media playing via a stereo in the vehicle 104, audio-visual media playing via a video player in the vehicle, and/or any other type of media inside of a vehicle (e.g., media presented via a laptop computer, a smartphone, and/or a tablet such as an iPad™). In some examples, the meter 112 detects and identifies the media playing in the vehicle 104 by detecting watermarks and/or signatures associated with the media.

Audio watermarking is a technique used to identify media such as television broadcasts, radio broadcasts, advertisements (television and/or radio), downloaded media, streaming media, prepackaged media, etc. Existing audio watermarking techniques identify media by embedding and/or otherwise associating one or more audio codes (e.g., one or more watermarks), such as media identifying information and/or an identifier that may be mapped to media identifying information, in and/or with an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be transmitted with, inserted, and/or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A good signature is one that is repeatable when processing the same media presentation, but that is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, in addition to being able to capture codes and/or signatures for media exposure monitoring, the meter 112 is also structured to capture, detect, and/or identify the navigational voice cues 110 generated by the navigation system 106 as described more fully below. However, in some other examples, the meter 112 is constructed to capture, detect, and/or identify the navigational voice cues 110 without having the functionality to monitor audience exposure to media as described above. In some examples, the meter 112 collects the in-vehicle audio data (including the navigational voice cues 110) and transmits the data to a central facility 114 of a data collection entity 116 without processing and/or specifically identifying navigation information based on the directions provided within the navigational voice cues 110. In such examples, the analysis and processing is performed by the central facility 114. In other examples, the meter 112 processes and analyzes the in-vehicle audio data internally so as to reduce the amount of data transmitted to the central facility 114. In some examples, the processing and analysis of the in-vehicle audio data is shared between both the meter 112 and the central facility 114.

By capturing and identifying the navigational voice cues 110 present in the in-vehicle audio, the general location of the vehicle 104 can be determined. In particular, as successive points of the route identified by the navigation system 106 are verbally articulated, captured by the meter 112, and subsequently analyzed, the approximate location of the vehicle 104 can be determined. In some examples, the location of the vehicle 104 is determined in substantially real time. In some examples, the meter 112 monitors the navigational voice cues 110 to determine a future or anticipated location of the vehicle 104 (e.g., based on an upcoming route point identified by the navigational voice cues 110). Further, by connecting successive points of the route identified by the navigational voice cues 110 in a series, the route taken by the vehicle 104 through the navigated trip can be recreated via an interpolation method.

In some examples, a particular point on a route (e.g., an intersection (or the road associated therewith)) identified by a voice cue 110 may have a relatively generic or common name. For example, the navigational directions may indicate that a driver is to turn left on to Third Avenue in 0.6 miles. Many cities have a Third Avenue such that the particular city cannot be directly known from the navigational voice cue 110. However, in some examples, this obstacle is overcome by storing a series of navigational voice cues 110 over time. By connecting multiple route points (e.g., intersections) identified on the route of the vehicle 104, the cities that have each of the roads identified and that intersect in the same manner as provided by the navigation system 106 can be narrowed down via a process of elimination until the particular city is identified. In other examples, the navigational voice cues 110 may include embedded audio codes or watermarks that identify the particular city in which the vehicle 104 is located. In such examples, the meter 112 can extract the code(s) and identify the city by comparing the code(s) to a reference table. In some examples, the person 102 may manually designate the city where the vehicle 104 is located by entering such as an input into a user interface on the meter 112. Using any of the above techniques, the location of the vehicle at particular points in time as well as the route travelled by the vehicle 104 can be determined, even when some of the navigational voice cues 110 identify generically named roads.

In some examples, the meter 112 also collects information identifying the occupants of the vehicle 104 (referred to herein as vehicle occupant data) for reporting to the central facility 114 of the data collection entity 116 for analysis and/or compilation with the navigation information determined from the in-vehicle audio data. In some examples, the vehicle occupant data is collected through a login or input in the user interface of the meter 112 by the occupants to indicate their presence in the vehicle. In some examples, the vehicle occupant data indicates a number of occupants in the vehicle 104. In some examples, the vehicle occupant data indicates certain demographic characteristics of the occupants and/or uniquely identifies the occupants. For example, if the person 102 and/or other occupants are consenting panelists, their previously collected demographics may be accessed when they login with their unique login credentials via the meter 112.

The in-vehicle audio data (from which the navigation information is obtained), the vehicle occupant data, and any other data collected by and/or transmitted from the meter 112 to the central facility 114 are collectively referred to herein as meter data. The navigation information determined from the voice cues 110 captured by the meter 112 may be used in a variety of beneficial ways. In some disclosed examples, the navigation information is used to locate the vehicle (and the person 102) to provide geographically targeted advertisements or promotional information to the person 102 associated with business(es) located in the vicinity of the person 102. For example, the business(es) 118 of FIG. 1 may register with the data collection entity 116 and provide advertisements or promotional offers for distribution within one or more particular geographic regions or target areas. In some examples, the target area(s) correspond to all roads and/or intersections within a threshold distance (e.g., ½ mile, 1 mile, 2 miles, etc.) of particular locations (e.g., the address of the business(es)). In some examples, the target area(s) correspond to specifically identified intersections, roads, and/or portions of roads (e.g., the road(s) on which the business(es) are located and/or the surrounding roads and/or intersections). In some examples, the target area(s) are bounded areas defined by certain roads or other geographic markers. The target area(s) may additionally or alternatively be defined in any other suitable matter. In some examples, the data collection entity 116 compares the navigation information collected via the navigational voice cues 110 in the vehicle 104 with the target areas specified by the business(es) 118 to determine whether the vehicle 104 (and, thus, the person 102) is located within or near the target area and/or anticipated to enter the target area. If the data collection entity 116 determines that the person 102 has entered or is anticipated to enter a target area, the data collection entity 116 may provide the advertisement or promotional information associated with the target area to the person 102. In some examples, the data collection entity 116 is not associated with delivering advertisements. Instead, the data collection entity provides the location information and identifier(s) of the person(s) in the vehicle to the business(es) 118 who use that information to deliver advertisements, coupons, or other content to the person(s). The delivered advertisements, coupons, or other content may be personalized and may be delivered via any suitable medium (e.g., text, email, broadcast media, a personalized billboard changed in real time, etc.). Any of these media can be used irrespective of whether the data collection entity 116, the business(es) 118, or both are delivering the advertisements, coupons, and/or other content to the person(s) in the vehicle 104.

In some examples, a point on a route (e.g., an intersection) identified by the navigational voice cue 110 may be located within a target area while the vehicle 104 is still a significant distance outside from the target area. For example, the navigation system 106 may identify the next turn in the voice guided directions to be at a route point (e.g., an intersection) that is 15 miles down the road the vehicle 104 is currently driving down (i.e., 15 miles from the vehicle). In such examples, even though the person 102 may be well outside a target area (e.g., a half mile radius circle that includes the identified route point), the data collection entity 116 and/or the business(es) 118 may nevertheless provide the advertisement associated with the target area to the person 102 because the navigational voice cues 110 indicate the vehicle 104 transporting the person 102 is at least heading in the direction of the target area. That is, the anticipated (e.g., future) location of the vehicle 104 is expected to be within the target area.

In some examples, the driver of the vehicle 104 may disregard the navigational directions and/or independently change course prior to reaching an identified route point (e.g., intersection) in a target area such that the navigation system 106 recalculates a new route that avoids the target area. In some such examples, the data collection entity 116 and/or the business(es) 118 may nevertheless provide the advertisement associated with the target area because the navigational voice cues 110 indicated that the person 102 was at least approaching the target area and, thus, will likely pass nearby (e.g., within a threshold distance of the target area. Furthermore, in some examples, the central facility 114 provides the advertisements in substantially real time as the navigational voice cues 110 are collected and reported by the meter 112. In such examples, the advertisement may be provided to the person 102 based on the anticipated location of the vehicle 104 before subsequent voice cues 110 indicate a change in the travel path of the vehicle 104.

In some examples, the geographically targeted advertisements are provided through a text message and/or email to the person 102 that may be accessed by a mobile device 120 (e.g., smartphone) of the person 102. In some examples, the text message and/or email directly contains the advertisement associated with the target area. Additionally or alternatively, in some examples, the text message and/or email contains a link to a website where the promotional information is located. In some such examples, the business(es) 118 may distribute and/or be able to access and/or edit the website to dynamically update the advertisement in substantially real-time. For example, a deli may have a surplus of certain food products that need to be sold. Accordingly, the deli may designate a target area within a one mile radius of its location and upload information onto the website concerning a promotional sale of the surplus products. If after a certain period of time, the surplus products are sold, the deli may remove the promotional information from the website and/or alter it in other ways based on a response to the promotional sale.

In some examples, the data collection entity 116 and/or the business(es) 118 may limit advertisements provided to people within the target area to those corresponding to preferences and/or interests of the people (e.g., based on information they provided when establishing a profile when registering to be tracked as disclosed herein). Similarly, in some examples, the data collection entity 116 and/or the business(es) 118 may limit the people to which an advertisement is provided based on target characteristics (e.g., demographic characteristics) of consumers for which the advertisement is intended as identified by the business(es) 118 associated with the advertisement.

In some disclosed examples, the navigation information determined from the voice cues 110 captured by the meter 112 may be used to determine exposure of people to outdoor advertisements (e.g., billboards). For example, the business(es) 118 of FIG. 1 may register with the data collection entity 116 and provide information indicative of the location of outdoor advertisements for which the business(es) 118 desire exposure metrics. In some such examples, the data collection entity 116 analyzes the navigation information based off of the navigational voice cues 110 to generate or recreate a route or travel path of the vehicle 104. In some examples, the central facility 114 analyzes the travel path of the vehicle 104 to determine whether the vehicle 104 passed the locations of the outdoor advertisements identified by the business(es) 118. If the central facility 114 determines that the vehicle 104 did pass an advertisement, then the exposure of the person 102 to that advertisement is counted. In some examples, after determining the travel path of the vehicle, the central facility 114 provides the travel path to the business(es) 118 to analyze against the location of advertisement(s) to determine exposure.

In some examples, the data collection entity 116 generates the travel path of the vehicle 104 by connecting successive route points (e.g., intersections) identified by the navigational voice cues 110. However, in some examples, the vehicle 104 may not follow the navigation directions by either taking an unguided turn before reaching an identified route point (e.g., intersection) or passing the identified route point (e.g., intersection) without taking the appropriate action (e.g., failing to turn in the direction designated or turning when continuing straight was directed). Typically, the navigation system 106 will detect that the vehicle 104 has departed from the designated travel path and, thus, generate a new voice cue indicating the navigation system 106 is recalculating. Accordingly, in some examples, the most recent route point (e.g., intersection) identified before the recalculating navigational voice cue is excluded from the chain of route points (e.g., intersections) connected together to define the travel path of the vehicle 104. This exclusion would be appropriate if, for example, the announced route point is not reached. In other examples, the most recent route point identified before the recalculating cue is nevertheless included in the chain of route points because it is subsequently determined that the vehicle 104 passed the identified route point but failed to take the appropriate action (e.g., continued straight through an intersection (thereby passing the intersection) rather than turning).

In some examples, the exposure of the person 102 to the advertisements is aggregated with exposure information collected from other people participating as panelists in a marketing research study to generate a report indicative of the reach of the advertisement. Additionally or alternatively, in some examples, the data collection entity 116 makes correlations between the advertisement exposure to the panelists and different demographic markets based on the demographic information previously received from the panelists.

In some examples, the navigation system 106 is integrated with the mobile device 120 of the person 102, while the meter 112 is a separate device. Alternatively, in some examples, the meter 112 is integrated with the mobile device 120 while the navigation system 106 is a separate device. In other examples, each of the navigation system 106, the meter 112, and the mobile device 120 are separate devices. The advantage of separating the navigation system 106 and the meter 112 is that the meter 112 does not have access to the precise GPS location of the vehicle 104 as determined by the navigation system 106. It is counterintuitive to determine the location of a vehicle based on navigational voice cues from a navigation system that has necessarily already determined the location of the vehicle. However, whereas the navigation system 106 can effectively pinpoint the location of the vehicle 104 at all times to precisely track the movement of the vehicle 104, the navigation information determined from the navigational voice cues 110 as disclosed herein is limited to general waypoints or markers on a route of the vehicle 104 corresponding to the intersections or other route points identified by the navigational voice cues 110. Because the meter 112 cannot precisely locate the vehicle 104 to the same degree as a GPS unit (e.g., the navigation system 106), consumers may be more willing to volunteer as panelists realizing that there is less intrusion upon their privacy or concern that their constant whereabouts is known. Further, in some examples, consumers may be given additional incentives to encourage their participation in the location monitoring techniques disclosed herein.

Figure 2:
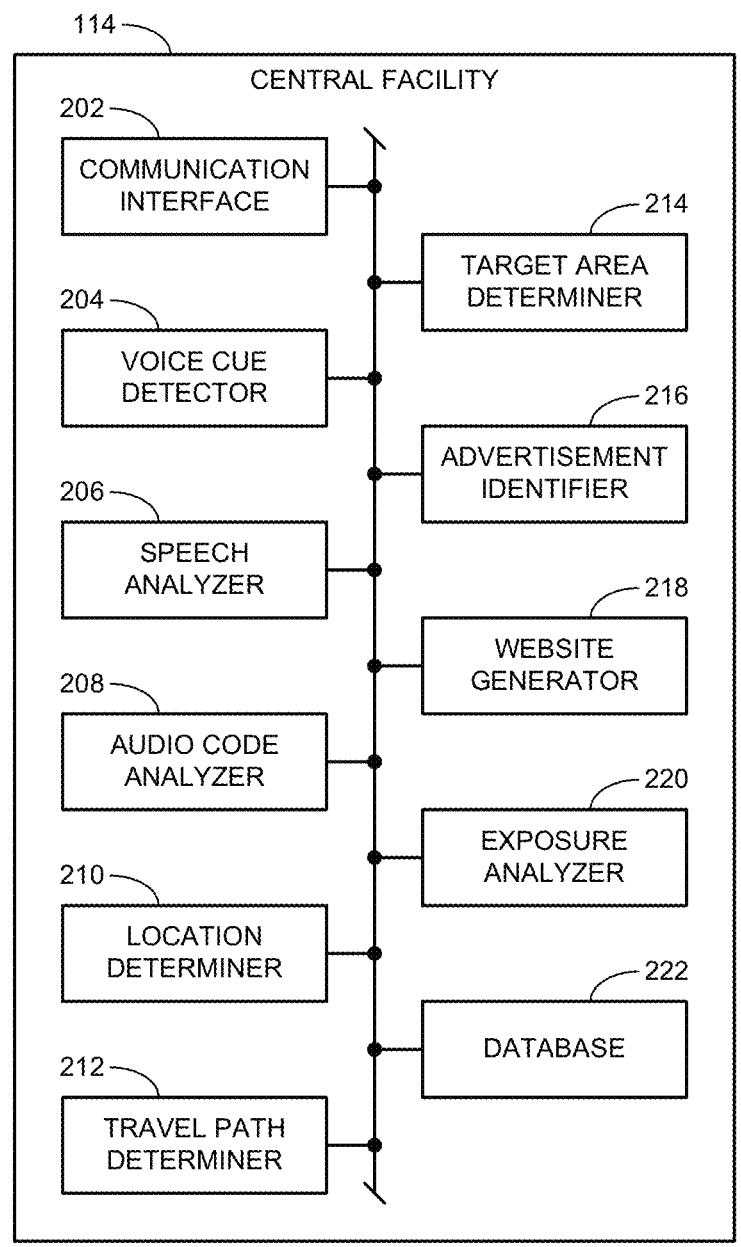
FIG. 2 is a block diagram of an example implementation of the example central facility of FIG. 1.

FIG. 2 is a block diagram of an example implementation of the example central facility 114 of FIG. 1. In the illustrated example, the central facility 114 includes an example communication interface 202, an example voice cue detector 204, an example speech analyzer 206, an example audio code analyzer 208, an example location determiner 210, an example travel path determiner 212, an example target area determiner 214, an example advertisement identifier 216, an example website generator 218, an example exposure analyzer 220, and example database(s) 222. In some examples, the advertisement identifier 216, the website generator 218 is not included and is instead implemented by the business(es) 118.

In the illustrated example of FIG. 2, the central facility 114 is provided with the communication interface 202 to receive in-vehicle audio data, vehicle occupant data, and/or any other data transmitted from the meter 112. In some examples, the communication interface 202 receives similar data from other meters inside other vehicles. In some examples, the in-vehicle audio data includes audio within the vehicle 104 captured by the meter 112. In some examples, the in-vehicle audio data includes the navigational voice cues 110 generated by the navigation system 106. In some examples, the navigational voice cues 110 are captured by the meter 112 with other ambient noises (e.g., talking by the in-vehicle occupants, noise from the vehicle radio, etc.) without any processing, filtering, altering, etc. In other examples, the meter 112 may process, filter, or otherwise alter the captured audio before transmission to the central facility 114. An example manner of identifying spoken comments is described in U.S. Provisional Application Ser. No. 60/511,859, U.S. Provisional Application Ser. No. 60/578,196; U.S. Pat. Nos. 7,587,732; 8,539,527; 8,806,535; and U.S. patent application Ser. No. 14/448,715 mentioned above. This technique can be applied to collecting the voice commands.

In some examples, the vehicle occupant data includes information indicative of the occupants in the vehicle 104. In some examples, the vehicle occupant data indicates a number of occupants in the vehicle 104. In some examples, the vehicle occupant data identifies certain demographic characteristics associated with the occupants. In some examples, the vehicle occupant data uniquely identifies the occupants of the vehicle (e.g., as particular panelists and/or guests of a panelist).

Further, in some examples, the communication interface 202 receives advertising information provided from business(es) (e.g., the business(es) 118 of FIG. 1). In some examples, the advertising information includes advertisements and/or promotional sales information that are targeted to a particular geographic region or target area. In some examples, the advertising information includes a designation of the target area and/or information with which the target area can be determined. In some examples, the advertising information includes a time and/or duration for the promotional offer and/or advertisement associated with the target area. For example, a particular advertisement may be for a discounted lunch at a restaurant with the distribution of the advertisement being specified as between 11:00 am and 1:30 pm. In some examples, the central facility 114 compares the location of the vehicle, as determined in accordance with the teachings disclosed herein, with the target area to identify advertisements to be provided to the occupants of the vehicle when they are within or approaching the corresponding target areas. In other examples, the location data is passed from the central facility 114 to the business(es) 118 and the business(es) 118 attend to selecting and/or sending the ads to the panelists).

Additionally or alternatively, in some examples, the communication interface 202 receives advertising information from the business(es) 118 indicative of the locations of outdoor advertisements, such as billboards. In some such examples, the central facility 114 compares the travel path of the vehicle, as determined in accordance with the teachings disclosed herein, with the location(s) of the outdoor advertisement(s) to measure exposure of the vehicle occupants to the advertisement(s) and/or to estimate the reach of the outdoor advertisement(s).

In the illustrated example of FIG. 2, the central facility 114 is provided with the voice cue detector 204 to analyze the in-vehicle audio data captured by the meter 112 to detect and/or distinguish the navigational voice cues 110 from other ambient noises. Further, the central facility 114, of the illustrated example, is provided with the speech analyzer 206 to analyze the detected voice cues 110 using speech recognition technology to determine or extract navigation information corresponding to the content of each navigational voice cue. An example manner of implementing the speech analyzer 206 is described in U.S. Provisional Application Ser. No. 60/511,859, U.S. Provisional Application Ser. No. 60/578,196; U.S. Pat. Nos. 7,587,732; 8,539,527; 8,806,535; and U.S. patent application Ser. No. 14/448,715 mentioned above. For example, some voice cues 110 may indicate a current road the vehicle is travelling on, an upcoming road onto which the vehicle is to travel, the intersection at which the car is to change from the current road to the upcoming road, and/or some other route point. Further, in some examples, the voice cues 110 may provide guidance on how the driver is to get from the current road on to the upcoming road (e.g., by turning right, exiting left, staying straight, heading south, etc.). In some examples, the voice cues 110 also indicate a distance from the present location of the vehicle to the next designated route point (e.g., a next intersection). In some examples, the voice cues 110 indicate the navigation system 106 is recalculating a new route for the vehicle 104 because the vehicle has gone the intended route by changing direction before reaching the upcoming route point (e.g., a next intersection) or passing the route point (e.g., a next intersection) without following the guidance provided.

In the illustrated example of FIG. 2, the central facility 114 is provided with the audio code analyzer 208 to detect and analyze audio codes (e.g., watermarks) embedded in the navigational voice cues 110. In some examples, the audio codes indicate the city where the vehicle 104 is located. In this manner, the road designated by each voice cue 110 can be uniquely identified even when the name of the road is generic or common with multiple cities.

In the illustrated example of FIG. 2, the central facility 114 is provided with the location determiner 210 to determine a location of the vehicle 104 based on the navigation information extracted from the navigational voice cues 110 by the speech analyzer 206. Further, the example central facility 114 is provided with the travel path determiner 212 to determine a travel path or route of the vehicle 104 based on the navigation information. More particularly, in some examples, the location determiner 210 determines the location of the vehicle 104 at a given point in time based on the particular roads (and corresponding route points such as intersections) identified by the navigational voice cues 110. In some examples, the location determiner 210 determines an anticipated or upcoming location of the vehicle 104 because the precise location of the vehicle between navigational voice cues may not be known but the guided next route point (e.g., intersection) is known. Thus, while the precise location of the vehicle 104 may not be known, the approximate location can be determined as the vehicle 104 reaches each designated route point and a subsequent navigational voice cue is provided by the navigation system 106. Similarly, in some examples, the travel path determiner 212 determines the travel path of the vehicle 104 by connecting successive route point (e.g., roads and/or intersections) identified by successive navigational voice cues 110 to effectively re-create or chart out the route taken by the vehicle 104.

In some examples, before the specific location and/or travel path of the vehicle 104 can be determined, the current city where the vehicle 104 is located must be determined. In some examples, the city is determined by the audio code analyzer 208 analyzing audio codes as described above. In other examples, the person 102 is prompted to enter or otherwise provide the appropriate city via the meter 112. The identifier of the city is transmitted to the central facility 114 along with other meter data (e.g., the in-vehicle audio data and/or the vehicle occupant data). In some examples, the city is determined by storing the navigation information extracted from successive navigational voice cues 110 and matching the navigation information to data representing maps of various cities until the city can be uniquely identified based on a process of elimination. In some such examples, an initial estimate for the proper city is made based on recently visited cities as these are the most likely candidates. To this end, an identification of the most recent city visited is stored in the meter 112 as part of the shutdown/power down process of the meter.

In some examples, one or more of the navigational voice cues 110 may be a "recalculating" cue. In some such examples, even though the vehicle may no longer be approaching the route point identified in the immediately preceding voice cue, the location determiner 210 nevertheless uses the preceding voice cue as an approximation of the location of the vehicle 104. The immediately preceding voice cue may still be relied on because the recalculating by the navigation system 106 is likely to derive a new path to the final destination that will pass near, if not guide the vehicle 104 back to, the previously identified route point. Of course, as a subsequent voice cue 110 is provided, the location determiner 210 of the illustrated example will update the location or anticipated location of the vehicle based on the new navigation information. By contrast, in some examples, the route point identified by a voice cue immediately preceding a "recalculating" cue is excluded from the travel path of the vehicle 104 as determined by the travel path determiner 212. The travel path determiner 212 may exclude or disregard a navigational voice cue immediately preceding a "recalculating" cue because the "recalculating" cue indicates the vehicle 104 has departed from the route indicated by the preceding voice cue. However, in some examples, the navigation system 106 may have provided the "recalculating" cue because the vehicle 104 failed to take the appropriate action at the designated route point (e.g., failed to turn at a designated intersection) but nevertheless passed through the route point. Accordingly, in some examples, the travel path determiner 212 analyzes navigation information from subsequent navigational voice cues 110 before determining whether to include or omit the route point identified before the "recalculating" cue as part of the travel path of the vehicle 104. Such analysis may use interpolation or other techniques to determine whether the route point (e.g., intersection) was, in fact, passed.

For purposes of explanation, the following is an example series of navigational voice cues captured by the meter 112 of the illustrated example and transmitted to the central facility 114:

(1) "Head west on 12th Street"
(2) "In 1.6 miles, turn right onto Forest Avenue"
(3) "In 8.1 miles, turn right onto Benton Street"
(4) "Recalculating"
(5) "In 0.5 miles, turn left onto Jules Avenue"

In the above example, the first navigational voice cue identifies a direction (West) and a street (12th Street). Many cities have a 12th Street such that the particular city cannot be determined in this example based solely on the voice cue unless the city is identified through an audio code detected via the audio code analyzer 208 and/or is input by the person 102 (e.g., by specifying the city name, by entering the city name into the meter 112 via an input device, etc.). Further, even if the city is known, the specific location of the vehicle 104 may not be known because the first voice cue does not designate where along 12th Street the vehicle 104 is located. However, the second navigational voice cue identifies Forest Avenue as an upcoming intersecting road, thereby identifying a first route point (e.g., intersection) where the vehicle 104 is to turn right. As a result, the location determiner 210 may determine the location of the vehicle 104 at the time of the second voice cue as approximately 1.6 miles east of the intersection of Forest Avenue and 12th Street. Furthermore, the location determiner 210 may determine that a future or anticipated location of the vehicle 104 is at the designated route point (e.g., intersection). The time at which this is expected to occur may be determined based on the 1.6 mile instruction, the known speed limit of 12th Street, and/or a current traffic report. The travel path determiner 212 may begin generating the travel path by defining a line beginning 1.6 miles east of Forest Avenue on $12^{th}$ Street and moving in a direction towards the intersection. The line may not be straight. Instead, it may be curved and aligned with the actual path of 12th Street.

Before either the location determiner 210 or the travel path determiner 212 can precisely determine the location or travel path of the vehicle 104, the city must be known. Of the cities that have a 12th Street, only a subset is likely to also have a Forest Avenue intersecting 12th Street. Based on this information, the location determiner 210 and/or travel path determiner 212 may be able to determine the particular city by narrowing down the cities that meet the criteria defined by the navigational voice cues. If there are still multiple cities that have all the roads and intersections as indicated, then the location determiner 210 and/or travel path determiner 212 may store the navigation information already received and wait for another voice cue to further filter possible cities until the particular city is identified via a process of elimination.

Typically, a subsequent navigational voice cue 110 is provided soon after the driver follows the previous voice cue. As such, when the third voice cue instructs the driver, "In 8.1 miles, turn right onto Benton Street," the location determiner 210 may determine that the vehicle 104 has just turned right from 12th Street onto Forest Avenue. Thus, while the precise location of the vehicle 104 may not be known at any given moment, each time a new navigational voice cue is provided, the location determiner 210 can determine the general location of the vehicle as being near the previously identified route point (e.g., intersection). Further, in some examples, additional voice cues may be provided immediately before a route point (e.g., an intersection) to serve as a reminder to a driver about the upcoming route point. As such, the location determiner 210 may determine the location of the vehicle 104 as being near the upcoming route point when a corresponding voice cue is detected. Furthermore, in some examples, the location determiner 210 may monitor the timing of each voice cue to predict the approximate location of the vehicle between identified route points.

The fourth navigational voice cue in the above example indicates that the navigation system 106 is recalculating the route for the vehicle 104. The recalculating voice cue in the above example may suggest that the driver has turned off of Forest before reaching Benton Street or that the driver failed to turn right onto Benton Street (e.g., drove passed the Benton Street intersection without turning). Because the recalculating voice cue indicates the vehicle 104 has diverted from the guided route, in some examples, the travel path determiner 212 disregards the Forest Avenue and Benton Street intersection as being on the travel path of the vehicle 104. However, the location determiner 210 may nevertheless store the intersection as a prediction of the general area to which the vehicle 104 is being navigated (e.g., an anticipated location of the vehicle 104).

In some examples, the location determiner 210 and/or the travel path determiner 212 distinguish between the driver turning off of Forest Avenue before Benton Street versus staying on Forest Avenue but driving past Benton Street based on the road identified in the navigational voice cue following the recalculating voice cue. For example, the fifth voice cue in the above example identifies Jules Avenue as the new next road to turn on (instead of Benton Street). As such, if Jules Avenue intersects with Forest Avenue beyond Benton Street, the location determiner 210 and/or the travel path determiner 212 may determine that the vehicle 104 is still on Forest Avenue but has missed the Benton Street turn. On the other hand, if Jules Avenue does not intersect with Forest Avenue after the Benton Street intersection (e.g., runs parallel to Forest Avenue), then the location determiner 210 and/or the travel path determiner 212 may determine that the vehicle 104 has turned off of Forest Avenue onto another road towards an upcoming intersection (that is 0.5 miles away) with Jules Avenue. In this latter scenario, the name of the cross street may not be known. However, as future navigational voice cues are detected, the location determiner 210 will be able to reassess the approximate location of the vehicle 104. Similarly, while the particular cross-street may not be identified by the voice cues, as additional voice cues are detected the travel path determiner 212 may be able to retrace the path of the vehicle 104 to at least approximate the cross street. Furthermore, in some examples, the location determiner 210 may predict the approximate location where the vehicle turned off of Forest Avenue based on an estimated speed of the vehicle and a time since the vehicle turned onto Forest Avenue corresponding to the time of the third navigational voice cue in the above example. Likewise, the timing of the recalculating voice cue relative to the immediately preceding voice cue can be used to determine whether the vehicle 104 has turned before reaching the designated route point (the intersection at Benton Street) or passed the route point without turning.

In the illustrated example, the central facility 114 is provided with the target area determiner 214 to determine one or more target area(s) corresponding to geographically defined area(s) in which advertisement(s) provided by one of the business(es) 118 is to be disseminated. In some examples, the advertisement(s) are a promotional offer for goods or services located within the target area. In some examples, the target area(s) are defined based on a threshold distance (e.g., a radius, as travelled by a vehicle) from specific location(s) such as, for example, the address(es) of the business(es) providing the promotional offer(s) or other advertisement(s). For example, a business 118 may provide the central facility 114, via the communication interface 202, with an advertisement for a promotional sale at a location of the business 118. Along with the advertisement, the business 118 may provide an address of the location of the business and request the advertisement to be provided to people detected to be travelling within two miles of the address. In some examples, the two mile threshold distance is defined as a radius defining a circle around the business address. In such examples, the target area determiner 214 generates a target area by identifying the roads and/or intersections within the two mile radius of the specified address.

In some examples, the target area(s) are defined based on specifically identified intersections, roads, and/or portions of roads selected or identified by the business(es) 118 associated with the advertisement(s) to be disseminated. For example, a business 118 may be aware of the high-traffic (and/or high speed) roads near where the business is located and, thus, identify these roads (and corresponding intersections) over a relatively large distance (e.g., five miles) from the business address and then identify less busy (and/or lower speed) roads that are closer to the business address (e.g., within one mile). In such examples, the target area determiner 214 stores the identified roads and/or intersections as the target area for the corresponding advertisement.

In some examples, the target area(s) are bounded areas defined by certain roads or other geographic markers. For example, a business 118 may identify two roads running east and west and two cross-roads running north and south to define a rectangular area within which the business desires the advertisement to be disseminated. In such examples, the target area determiner 214 generates a target area by identifying the roads and intersections within the geographic area bounded by the designated roads.

In some examples, other methods to define the target area(s) may be implemented and/or a combination of more than one of the above techniques may be implemented. Further, in some examples, any particular target area may include more than one discrete geographic area. For example, a business 118 may define an area within a one mile radius of the address of the business as part of the target area and separately define a main road that passes through the city near the business 118 but outside the one mile radius as another part of the target area. Additionally or alternatively, a business 118 may have multiple locations where the promotional offer is valid (e.g., addresses of a chain of stores) such that the target area includes geographical areas corresponding to the multiple locations.

In the illustrated example of FIG. 2, the central facility 114 is provided with the advertisement identifier 216 to identify advertisement(s) to be provided to the person 102 based on the detected travel path of the vehicle 104. That is, in some examples, the advertisement identifier 216 compares the route points (e.g., roads and/or intersections) identified by the navigational voice cues 110 to the roads and/or intersections within the target area. If there is a match (e.g., the voice directed travel path of the vehicle 104 enters the target area), the example targeted advertisement identifier 216 identifies the advertisement(s) associated with the target area for providing to the person 102 in the vehicle 104. In some examples, multiple business(es) 118 may provide different advertisements corresponding to different target areas and/or different target demographics to the central facility 114. In such examples, the advertisement identifier 216 compares each route point (e.g., road and/or intersection) designated by the navigational voice cues 110 with each of the target areas. In some such examples, the voice cues 110 may guide the vehicle 104 through more than one target area. Accordingly, in some examples, the targeted advertisement identifier 216 identifies multiple advertisements to be provided to the person 102. In some examples, the advertisement identifier 216 identifies different advertisements to be provided to different occupants in the vehicle 104 (e.g., a first advertisement for the person 102 and a second different advertisement for a different occupant). In some such examples, as both occupants are at the same location (e.g., within the same vehicle) the particular advertisement identified for each occupant may be based on other factors such as, for example, the demographics and/or preferences of the occupants.

As the purpose of advertisements distributed in this matter is to target individuals geographically located near a particular area, in some examples, the detection and analysis of the navigational voice cues 110 and the resulting identification and provision of advertisements to such individuals is accomplished in substantially real-time. In this manner, the advertisements will be provided to the person 102 (or other targeted consumers) while the person 102 is still near to the target area. In some examples, although the navigational voice cues 110 identify a road, intersection, or other route point within a target area, the person 102 may not be physically located in the target area. For instance, using the example outlined above, the third voice cue identifies the intersection of Forest Avenue and Benton Street as being 8.1 miles away. In some examples, the intersection may be within a target area associated with a one mile radius circle. In such examples, even though the vehicle 104 is 8.1 miles away, the advertisement identifier 216 nevertheless identifies the advertisement associated with the target area to be provided to the person 102 because the person is at least headed in the direction of the target area. Furthermore, in some examples, the advertisement identifier 216 identifies the advertisement to be provided even if the vehicle 104 changes course to avoid the previously designated intersection or to avoid the entire target area. Thus, the advertisement identifier 216 identifies advertisement(s) based on an expected path of the vehicle 104 or the anticipated location of the vehicle 104 corresponding to approaching roads and/or intersections or other route point rather than waiting until the vehicle 104 is actually located within the target area.

In some examples, in addition to identifying the target area, the business(es) 118 may identify one or more demographics and/or other characteristics of individuals targeted for the advertising campaign. Accordingly, in some examples, the advertisement identifier 216 compares the demographic characteristic(s) of the person 102 (as stored in a profile for the person 102) with the one or more criteria specified by the business(es) 118. If the person 102 has characteristic(s) matching the criteria, the advertisement identifier 216 identifies the associated advertisement(s) to be provided to the person 102. However, if the person 102 does not meet the criteria set by the business(es) 118, the advertisement identifier 216 will exclude the associated advertisement(s) from being provided to the person 102 even if the designated travel path of the vehicle 104 passes through the corresponding target area.

In some examples, the person 102 may indicate particular interests and/or preferences relating to which the person 102 desires to receive notification of advertisements. Additionally or alternatively, the person 102 may indicate one or more particular categories or types of advertisements to which the person 102 does not want to receive advertisements. In some examples, such preferences are stored in a profile associated with the person 102. In some such examples, the advertisement identifier 216 will exclude advertisement(s) from being provided to the person 102 if they do not meet the preference(s) indicated even if the designated travel path of the vehicle 104 passes through the corresponding target areas.

In some examples, identified advertisement(s) are communicated to the person 102 via the communication interface 202. More particularly, in some examples, the communication interface 202 communicates the advertisement(s) identified by the advertisement identifier 216 via a text message and/or an email to a mobile device 120 of the person 102. In some examples, the advertisement is self-contained within the email or text message. In other examples, the email or text message indicates that there is a new advertisement associated with a good or service near where the person 102 is located that can be viewed by accessing a website that manages and/or aggregates such advertisement(s). In some examples, the email or text message provides a link to the website. In some examples, the website generator 218 is provided to generate and/or manage the website. For example, the website generator 218 may aggregate different advertisement(s) received from different business(es) 118 and place them in the website. In some examples, the website generated by the website generator 218 requires a login such that the person 102 is directed to a portion of the website with the advertisement(s) identified by the advertisement identifier 216 particular for the person and/or the location of the person.

In the illustrated example of FIG. 1, the central facility 114 is provided with the exposure analyzer 220 to determine exposure of the person 102 to outdoor advertisement(s). In some examples, the exposure analyzer 220 determines such exposure by comparing the travel path of the vehicle 104 (as determined by the travel path determiner 212) with the location(s) of outdoor advertisement(s) (as provided from the business(es) 118). If the travel path of the vehicle 104 passes by the location of a particular advertisement, the exposure analyzer 220 determines that the person 102 in the vehicle was exposed to the advertisement. In some examples, the exposure analyzer 220 may aggregate exposure data from multiple individuals and then statistically extrapolate the data to a more general population to estimate a reach of the advertisement. In some examples, the exposure analyzer 220 generates reports of such exposure and/or reach metrics for the business(es) 118.

In the illustrated example of FIG. 1, the central facility 114 is provided with the database(s) 222 to store the meter data received from the meter 112, the navigation information extracted from the navigational voice cues 110 (whether generated and provided by the meter 112 or generated at the central facility 114), and/or the location, anticipated location, and/or travel path of the vehicle 104 determined based on the navigational voice cues 110. Further, in some examples, the database(s) 222 store advertising information received from the business(es) 118 corresponding to the advertisement(s) and/or associated information to be provided to potential customers, information regarding the target areas of such advertisements, and/or the information regarding to the location of outdoor advertisements of the business(es) 118. Further still, in some examples, the database(s) 222 store reference maps or similar navigation based information to look up the roads, intersections, and other route points detected from the navigational voice cues 110.

While an example manner of implementing the central facility 114 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 202, the example voice cue detector 204, the example speech analyzer 206, the example audio code analyzer 208, the example location determiner 210, the example travel path determiner 212, the example target area determiner 214, the example advertisement identifier 216, the example website generator 218, the example exposure analyzer 220, the example database(s) 222, and/or, more generally, the example central facility 114 of FIG. 2 may be implemented by hardware, software, firmware and/or any combination of hardware, software and/or firmware. Thus, for example, any of the example communication interface 202, the example voice cue detector 204, the example speech analyzer 206, the example audio code analyzer 208, the example location determiner 210, the example travel path determiner 212, the example target area determiner 214, the example advertisement identifier 216, the example website generator 218, the example exposure analyzer 220, the example database(s) 222, and/or, more generally, the example central facility 114 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 202, the example voice cue detector 204, the example speech analyzer 206, the example audio code analyzer 208, the example target area determiner 214, the example location determiner 210, the example travel path determiner 212, the example advertisement identifier 216, the example website generator 218, the example exposure analyzer 220, and/or the example database(s) 222 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 114 of FIG. 1 may include one or more elements, processes and/or devices in addition to, or instead of, those illustrated in FIG. 2, and/or may include more than one of any or all of the illustrated elements, processes and devices.

Figure 3:
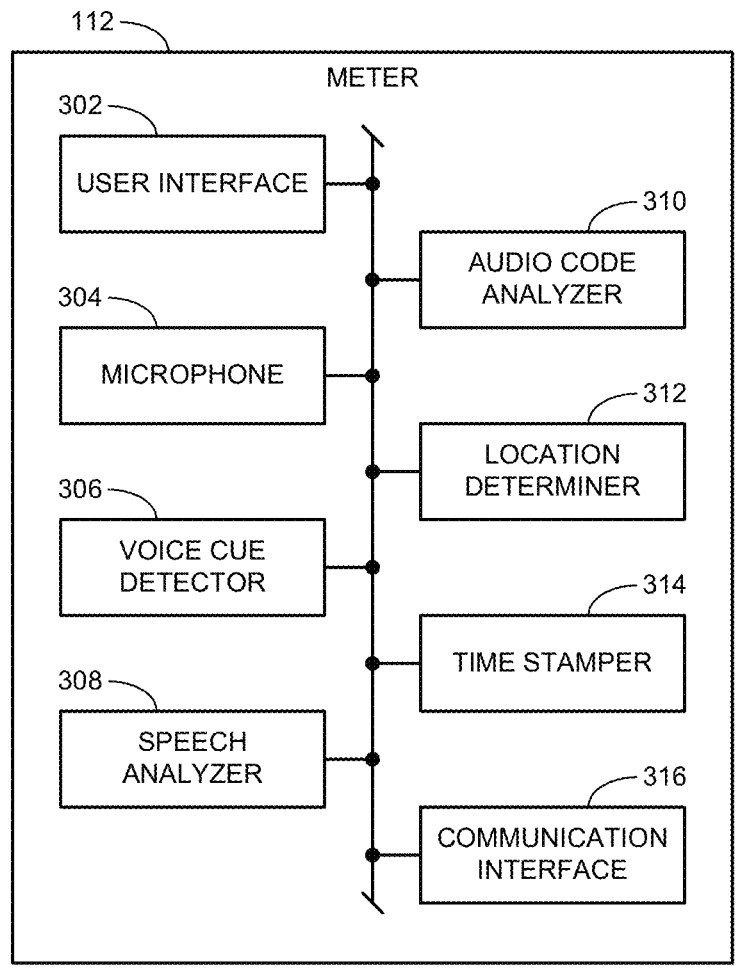
FIG. 3 is a block diagram of an example implementation of the example meter of FIG. 1.

FIG. 3 is a block diagram of an example implementation of the example meter 112 of FIG. 1. The example meter 112 of FIG. 3 includes an example user interface 302, an example microphone 304, an example voice cue detector 306, an example speech analyzer 308, an example audio code analyzer 310, an example location determiner 312, an example time stamper 314, and an example communication interface 316.

In the illustrated example of FIG. 3, the meter 112 is provided with the user interface 302 to enable the person 102 and/or other occupants in the vehicle 104 to identify their presence in the vehicle 104. The user interface may be implemented by a touchscreen, push button, switches, a microphone, and/or any other form of input device. The information entered by the vehicle occupants is combined to form the vehicle occupant data to be transmitted to the central facility 114. As described above, in some examples, the vehicle occupant data may include a count of the number of occupants in the vehicle 104, an identification of a demographic characteristic of the vehicle occupants, and/or the unique identification of the occupants. For example, the occupants may be panelists with a unique user account and/or identifier that is obtained upon (or shortly after) their entry into the vehicle by logging in via the user interface 302. In some examples, one or more of the occupants may not be panelists but guests in a panelist's vehicle. In such examples, the guests may enter that they are guests without being uniquely identified via the user interface 302. In some examples, the user interface 302 is provided to enable the person 102 to enter the city where the vehicle 104 is located to assist in determining the location of the vehicle in accordance with the teachings disclosed herein. In some examples, tags, near field or Bluetooth devices, smart phones, etc., are used to automatically log onto the meter upon entry into the vehicle.

In the illustrated example of FIG. 3, the meter 112 is provided with the microphone 304 to monitor and/or capture the in-vehicle audio data, which may include the navigational voice cues 110 and/or other ambient noises produced in the vehicle 104 where the meter 112 is located.

In the illustrated example of FIG. 3, the example voice cue detector 306, the example speech analyzer 308, the example audio code analyzer 310, and the example location determiner 312 of the example meter 112 function similar or identical to the corresponding example voice cue detector 204, the example speech analyzer 206, the example audio code analyzer 208, and the example location determiner 210 of the example central facility 114 described above in connection with FIG. 2. That is, in some examples, the meter 112 locally analyzes and processes the in-vehicle audio data to extract navigation information and/or determine the location of the vehicle 104 based on the navigational voice cues 110. In some such examples, the example voice cue detector 204, the example speech analyzer 206, the example audio code analyzer 208, and/or the example location determiner 210 may be omitted from the central facility 114. By contrast, if the analysis is to be implemented by the central facility 114 as described above, then some or all of the corresponding elements may be omitted from the meter 112. Further, in some examples, a different division of functionality may be implemented between the meter 112 and the central facility 114. For example, the meter 112 may include voice cue detector 306 and the speech analyzer 308 but omit the functionality of the audio code analyzer 310 and the location determiner 312, which are then implemented by the central facility 114. In this manner, the processing power and/or complexity of either the meter 112 or the central facility 114 may be adjusted to meet the needs of the particular circumstance.

In some examples, the meter 112 is provided with the time stamper 314 to time stamp the in-vehicle audio data and/or each navigational voice cue as it is collected by the microphone 304 and/or detected by the voice cue detector 306. In this manner, the timing of the navigational voice cues 110 can be analyzed to assist in approximating the location of the vehicle 104 and/or in generating the travel path of the vehicle 104.

In the illustrated example of FIG. 3, the meter 112 is provided with the communication interface 316 to meter data to the central facility 114 of the data collection entity 116 shown in FIG. 1. In some examples, the meter data includes the in-vehicle audio data (or navigation information if determined by the meter 112), the vehicle occupant data, and/or other data (e.g., the user designated city, time stamps, etc.) collected by the meter 112.

While an example manner of implementing the meter 112 of FIG. 1 is illustrated in FIG. 3, one or more of the elements, processes and/or devices illustrated in FIG. 3 may be combined, divided, re-arranged, omitted, eliminated and/or implemented in any other way. Further, the example user interface 302, the example microphone 304, the example voice cue detector 306, the example speech analyzer 308, the example audio code analyzer 310, the example location determiner 312, the example time stamper 314, the example communication interface 316, and/or, more generally, the example meter 112 of FIG. 3 may be implemented by hardware, software, firmware and/or any combination of hardware, software and/or firmware. Thus, for example, any of the example user interface 302, the example microphone 304, the example voice cue detector 306, the example speech analyzer 308, the example audio code analyzer 310, the example location determiner 312, the example time stamper 314, the example communication interface 316, and/or, more generally, the example meter 112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example user interface 302, the example microphone 304, the example voice cue detector 306, the example speech analyzer 308, the example audio code analyzer 310, the example location determiner 312, the example time stamper 314, and/or the example communication interface 316 is/are hereby expressly defined to include a tangible computer readable storage device or storage disk such as a memory, a digital versatile disk (DVD), a compact disk (CD), a Blu-ray disk, etc. storing the software and/or firmware. Further still, the example meter 112 of FIG. 1 may include one or more elements, processes and/or devices in addition to, or instead of, those illustrated in FIG. 3, and/or may include more than one of any or all of the illustrated elements, processes and devices.

Figure 4:
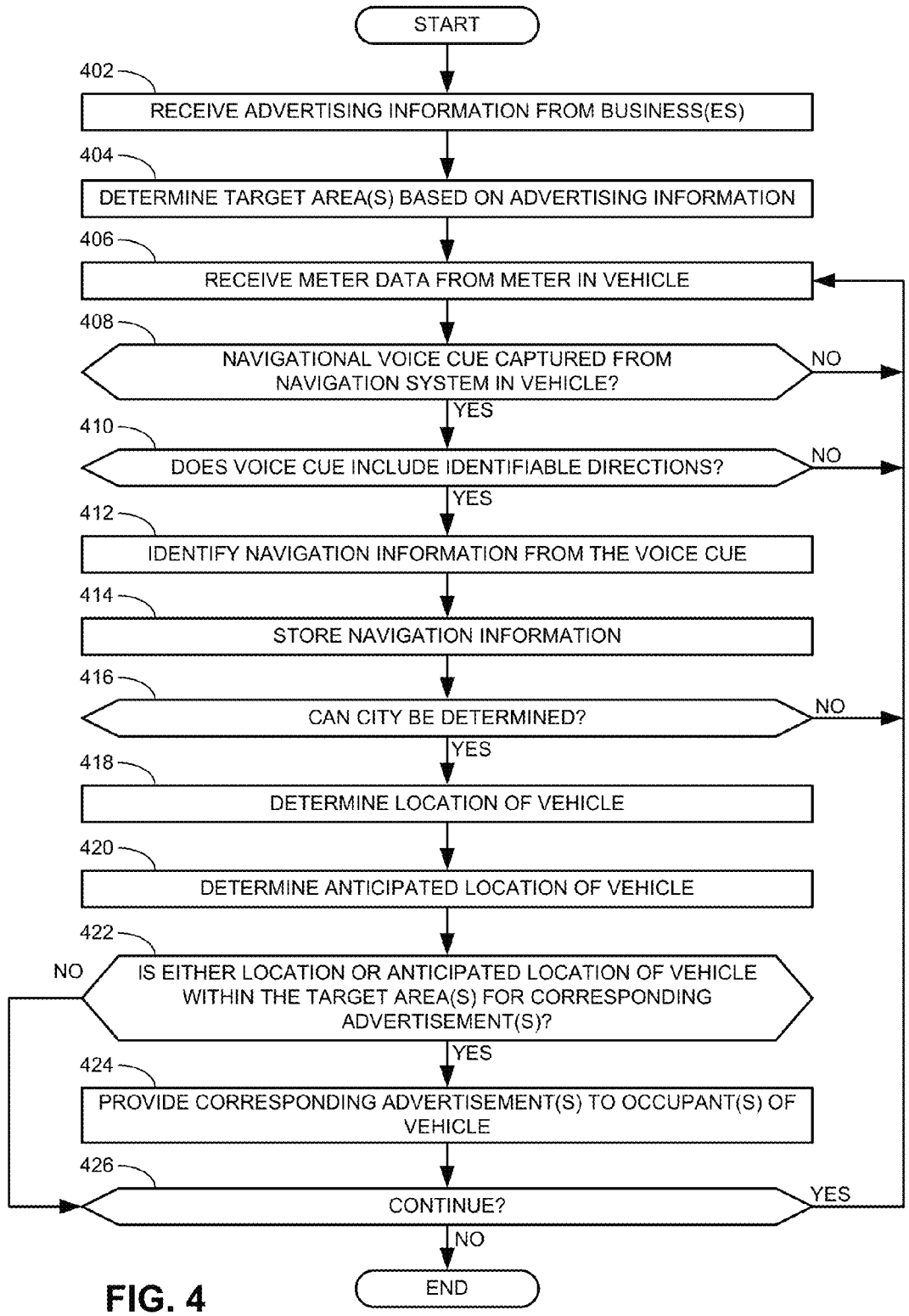
FIG. 4 is a flowchart representative of example machine readable instructions that may be executed to implement the example central facility of FIGS. 1 and/or 2.
Figure 5:
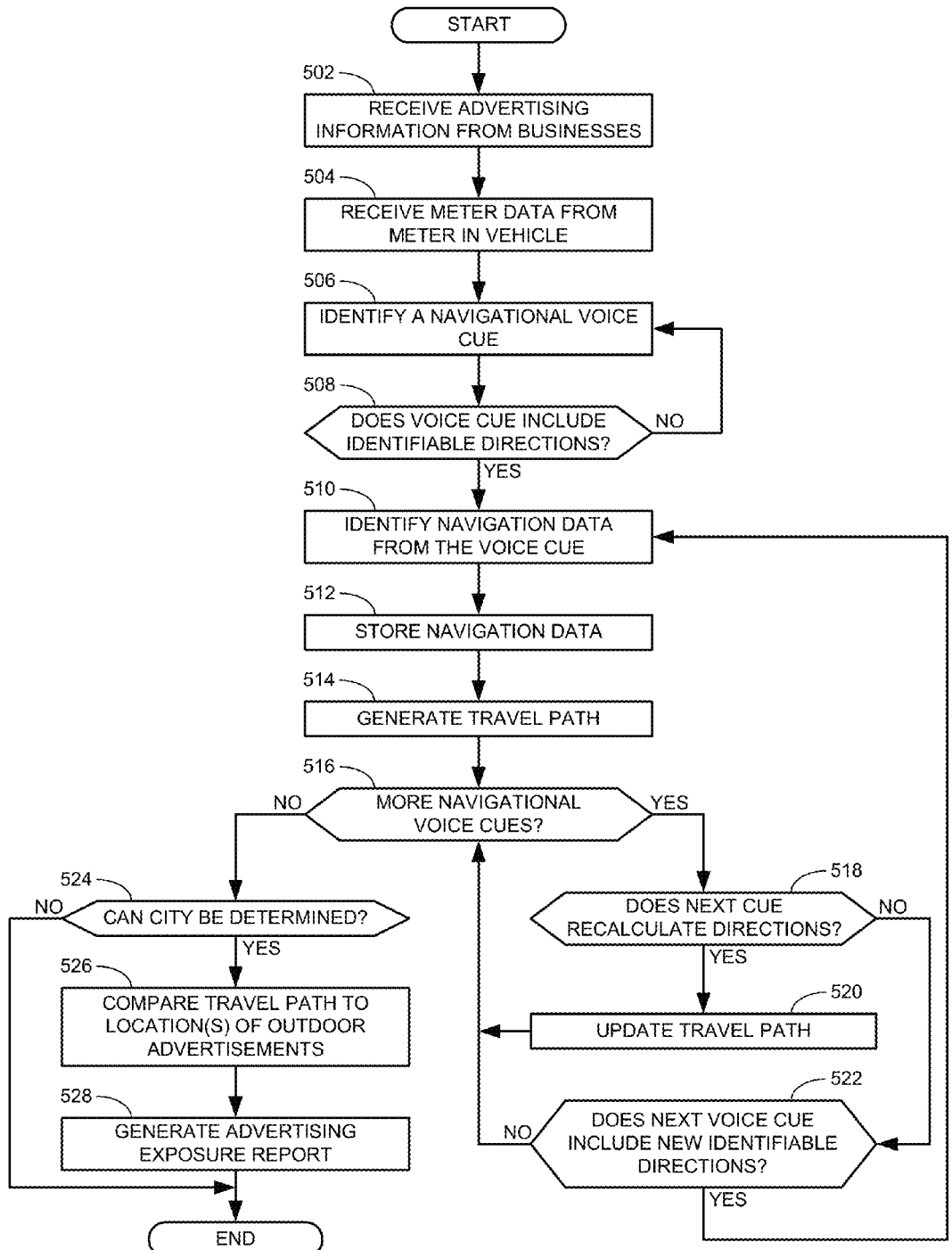
FIG. 5 is a flowchart representative of example machine readable instructions that may be executed to implement the example central facility of FIGS. 1 and/or 2.

Flowcharts representative of example machine readable instructions for implementing the central facility 114 of FIG. 2 is shown in FIGS. 4 and 5. In these examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example central facility 114 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4 and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Turning in detail to FIG. 4, the illustrated flowchart is representative of example machine readable instructions that may be executed to implement the example central facility 114 to provide geographically targeted advertisements to potential customers (e.g., the person 102). The example program begins at block 402 where the example communication interface 202 receives advertising information from one or more business(es) 118. In some examples, the advertising information includes advertisements and/or other promotional information as well as target location information indicative of a geographic region where the advertisement is targeted. At block 404, the example target area determiner 214 determines one or more target area(s) based on the advertising information. In some examples, block 402 may be repeated to enable the business(es) 118 to provide new advertising information and/or to adjust the advertising information previously provided. In such examples, the target area determiner 214 may continuously and/or dynamically determine new target area(s) based on the advertising information (block 404). At block 406, the example communication interface 202 receives meter data from a meter 112 in a vehicle 104. In some examples, the meter data includes in-vehicle audio data captured by a microphone 304 of the meter 112, vehicle occupant data entered by and/or otherwise collected from occupants (e.g., the person 102) via the user interface 302 of the meter 112, and/or other forms of information collected by the meter 112. In some examples, the in-vehicle audio data includes navigational voice cues 110 emitted from a navigation system 106 in the vehicle 104. In some examples, the meter 112 processes and/or analyzes the in-vehicle audio data and transmits the resulting navigation information as part of the meter data.

At block 408, the example voice cue detector 204 determines whether there is a navigational voice cue 110 captured from the navigation system 106 in the vehicle 104. For example, the voice cue detector 204 analyzes in-vehicle audio data captured by the microphone 304 of the meter 112 and transmitted by the communication interface 316 of the meter 112 to detect the navigational voice cues 110. If the example voice cue detector 204 does not detect a navigational voice cue, control returns to block 406 to receive additional meter data. Once the example voice cue detector 204 determines that there is a navigational voice cue (block 408), control advances to block 410. In some examples, the navigational voice cues 110 are detected by the voice cue detector 306 of the meter 112, which is then transmitted to the central facility 114 for further processing and analysis. In such examples, the example program of FIG. 4 may omit block 408 as it is implemented by the meter 112 instead of the central facility 114. In some such examples, block 408 is implemented by the example voice cue detector 306 in FIG. 3.

At block 410, the example speech analyzer 206 determines whether the detected voice cue includes identifiable directions (e.g., directions corresponding to an identifiable route point (e.g., road, approaching intersection, etc.)). If the voice cue does not include identifiable directions (e.g., the speech analyzer cannot interpret the voice cue or the voice cue is not giving directions (e.g., a "recalculating" cue)), control returns to block 406. If the voice cue does include identifiable directions, control advances to block 412 where the example speech analyzer 206 identifies navigation information from the voice cue. That is, the example speech analyzer 206 identifies the name of any roads, intersections, and/or route points specified by the voice cue, any distances specified by the voice cues, and/or any directions specified by the voice cue (e.g., turn right, head south, exit left, etc.). In some examples, the speech analyzer 308 of the meter 112 identifies such navigation information, which is then transmitted to the central facility 114 for further processing and analysis. In such examples, the example program of FIG. 4 may omit blocks 410 and 412 as they are implemented by the meter 112 instead of the central facility 114. In some such examples, blocks 410 and 412 are implemented by the example speech analyzer 308 of FIG. 3.

At block 414, the example database(s) 222 stores the navigation information. At block 416, the example location determiner 210 determines whether the city can be determined. In some examples, the city is determined by the audio code analyzer 208 analyzing the in-vehicle audio data associated with the navigational voice cue 110 to detect an audio code that identifies the city. In some examples, the city is determined based on information transmitted from the meter 112 and provided by the person 102 (e.g., by speaking the city name, by typing in the city name, by selecting the city name from a list, etc.). In some examples, the city is determined based on the navigation information. For example, the name of a road identified in the navigational voice cue 110 may be unique to a particular city, thus, enabling the city to be determined. If the location determiner 210 cannot determine the city (e.g., there is no audio code, no user input, and the navigation information is not unique), control returns to block 408 to detect a subsequent voice cue with additional navigation information to narrow the pool of potential cities until the particular city where the vehicle is located is determined via a process of elimination, at which point control advances to block 418.

At block 418, the example location determiner 210 determines the location of the vehicle 104. In some examples, the location of the vehicle 104 corresponds to an intersection or other route point identified by the voice cues. In some examples, the location of the vehicle 104 corresponds to a distance from a particular route point (e.g., intersection) identified by the voice cues. At block 420, the example location determiner 210 determines the anticipated location of the vehicle 104. In some examples, the anticipated location of the vehicle 104 corresponds to an approaching route point identified in a recent (e.g., most recent) navigational voice cue 110. In some examples, the meter 112 is provided with the audio code analyzer 310 and the location determiner 312 to determine the city and resulting location and/or anticipated location of the vehicle 104. In such examples, the resulting navigation information determined at the meter 112 may be transmitted to the central facility 114 for further processing and analysis. In some such examples, the example program of FIG. 4 may omit blocks 410, 412, 414, 416, 418, and 420 as they are implemented by the meter 112 instead of the central facility 114 (e.g., via the speech analyzer 308 and the location determiner 312 of FIG. 3). Further, in some such examples, if the location determiner 312 cannot determine the city (block 416), the meter 112 may prompt an occupant of the vehicle to identify the city and wait for a response before returning to block 408.

At block 422, the example advertisement identifier 216 determines whether either the location or the anticipated location of the vehicle 104 is within one or more target area(s) corresponding to one or more advertisement(s). If the example advertisement identifier 216 determines that either the location or the anticipated location are within target area(s) corresponding to advertisement(s), control advances to block 424 where the example communication interface 202 provides the corresponding advertisement(s) to occupant(s) (e.g., the person 102) of the vehicle 104. In some examples, the communication interface 202 provides the advertisement(s) directly to the occupant(s) via one or more email(s) and/or text message(s). In other examples, the communication interface 202 provides information to the occupant(s) indicating the advertisement(s) are accessible on a website generated by the example website generator 218. In some examples, the advertisement(s) are provided to the occupant(s) indirectly via the business(es) 118. For example, once the advertisement identifier 216 determines that either the location or the anticipated location of the vehicle 104 is within one or more target area(s) (block 422), the communication interface 202 provides the determined location to the business(es) 118 associated with the corresponding target area(s). In some such examples, the business(es) 118 may then provide the corresponding advertisement(s) to the occupant(s). Once the example advertisement(s) are provided to the occupant(s) (block 424), control advances to block 426. If the example advertisement identifier 216 determines that neither the location nor the anticipated location are within the target area(s) corresponding to the advertisement(s) (block 422), control advances directly to block 426. At block 426, the example program determines whether to continue. If so, control returns to block 406, otherwise the example program of FIG. 4 ends.

Although the example program of FIG. 4 is described with respect to meter data received from the meter 112 in the vehicle 104, in some examples, multiple instances of the program of FIG. 4 are executed at one time (e.g., based on meter data received from different meters in different vehicles).

Turning now to FIG. 5, the illustrated flowchart is representative of example machine readable instructions that may be executed to implement the example central facility 114 of FIG. 1 to track exposure of potential consumers (e.g., the person 102) to outdoor advertisements. The example program begins at block 502 where the example communication interface 202 receives advertising information from one or more business(es) 118. In some examples, the advertising information includes the location(s) of outdoor advertisement(s) (e.g., billboards) and/or other outdoor media for which the business(es) 118 desire exposure information. In some examples, block 402 may be repeated to enable the business(es) 118 to provide new advertising information and/or to adjust advertising information previously provided. At block 504, the example communication interface 202 receives meter data from a meter 112 in a vehicle 104.

In some examples, the meter data includes in-vehicle audio data captured by a microphone 304 of the meter 112, vehicle occupant data entered by occupants (e.g., the person 102) via a user interface 302 of the meter 112, and/or other forms of information collected by the meter 112. In some examples, the in-vehicle audio data includes navigational voice cues 110 emitted from a navigation system 106 in the vehicle 104. In some examples, the meter 112 may process and/or analyze the in-vehicle audio data and transmit the resulting navigation information as part of the meter data. In some examples, the example communication interface 202 receives meter data from other meters in different vehicles in addition to the meter data received from the meter data from the meter 112.

At block 506, the example voice cue detector 204 identifies a navigational voice cue 110. For example, the voice cue detector 204 analyzes the in-vehicle audio data captured by the microphone 304 of the meter 112 to detect the navigational voice cues 110. At block 508, the example speech analyzer 206 determines whether the detected voice cue(s) include identifiable directions (e.g., directions corresponding to an identifiable road or approaching intersection). If the voice cue(s) do not include identifiable directions (e.g., the speech analyzer cannot interpret the voice cue or the voice cue is not giving directions (e.g., a "recalculating" cue)), control returns to block 506. In some examples, the meter data associated with an entire trip by the vehicle 104 is received (block 504) in advance of block 506. In such examples, the voice cue detector 204 analyzes the in-vehicle audio data in chronological order such that the first navigational voice cue identified by the voice cue detector 204 is first in time. Thus, if control returns to block 506 because the example speech analyzer 206 determined that the first navigational voice cue did not include identifiable directions (block 508), the example voice cue detector 204 may identify the next voice cue from the in-vehicle audio data. In some examples, the program of FIG. 5 may be implemented in substantially real time such that the voice cue detector 204 identifies successive navigational voice cues as they are collected by the meter 112 and transmitted to the central facility 114. In some examples, the navigational voice cues 110 are detected by the voice cue detector 306 of the meter 112, which is then transmitted to the central facility 114 for further processing and analysis. In such examples, the example program of FIG. 5 to implement the central facility 114 may omit blocks 506 and 508 as they are implemented by the meter 112.

If the voice cue detector 204 of the illustrated example determines that the voice cue(s) include identifiable directions (block 508), control advances to block 510 where the example speech analyzer identifies navigation information from the voice cue. That is, the example speech analyzer 206 identifies the name of any roads, intersections, and/or route points specified by the voice cue, any distances specified by the voice cues, and any directions specified by the voice cue (e.g., turn right, head south, exit left, etc.). In some examples, the speech analyzer 308 of the meter 112 identifies such navigation information, which is then transmitted to the central facility 114 for further processing and/or analysis. In such examples, the example program of FIG. 5 may omit block 510 as it is implemented by the meter 112.

At block 512, the example database 222 stores the navigation information. At block 514, the example travel path determiner 212 generates a travel path. In some examples, the travel path is based on the navigation information identified from the navigational voice cues. At block 516, the example voice cue detector 204 determines whether there are more navigational voice cues. If there are more voice cues, control advances to block 518 where the example speech analyzer 206 determines whether the next voice cue recalculates the directions. That is, the example speech analyzer 206 determines whether the next voice cue is a "recalculating" cue, which is indicative of the vehicle 104 departing from the route indicated by the previous voice cue. If the example speech analyzer 206 determines that the next cue does recalculate directions, control advances to block 520 where the example travel path determiner 212 updates the travel path. For example, the travel path determiner 212 may remove or disregard the route point (e.g., road and/or intersection) identified in the previous voice cue from the travel path of the vehicle 104 being generated. In some examples, the previously identified route point (e.g., road and/or intersection) is merely flagged as potentially off route to be determined once subsequent navigational voice cues have been collected and analyzed. Control then returns to block 516 to determine if there are any more navigational voice cues. If the example speech analyzer 206 determines that the next cue does not recalculate directions (block 518), control advances to block 522 where the example speech analyzer 206 determines whether the next cue includes new identifiable directions. If the next voice cue does include new identifiable directions, control returns to block 508 to identify the navigation information associated with the voice cue to continue developing the travel path. If the example speech analyzer 206 determines that the next voice cue does not include new identifiable directions, control returns to block 516 to determine whether there are more navigational voice cues.

If the example voice cue detector 204 determines that there are no more navigational voice cues (block 516), control advances to block 524 where the example travel path determiner 212 determines whether the city can be determined. In some examples, the city is determined based on the audio code analyzer 208 analyzing the in-vehicle audio data associated with the navigational voice cue 110 to detect an audio code that identifies the city. In some examples, the city is determined based on information transmitted from the meter 112 provided by the person 102. In some examples, the city is determined based on the collected navigation information. If the travel path determiner 212 cannot determine the city (e.g., there is no audio code, no user input, and the navigation information is not unique to a particular city), the example program of FIG. 5 ends because there are no additional voice cues (block 516) with which the particular city may be identified. However, if the travel path determiner 212 can determine the city, control advances to block 526 where the example exposure analyzer 220 compares the travel path to the locations of the advertisement(s) provided by the business(es) 118. At block 528, the example exposure analyzer 220 generates an advertising exposure report. In some examples, the advertising exposure report indicates whether the vehicle 104 passed by the outdoor advertisement(s) to determine an exposure of the person 102 to the advertisement(s). In some examples, exposure data associated with individuals from multiple vehicles are aggregated to provide an indication of reach of the advertisements as part of the advertising exposure report. After block 528, the example program of FIG. 5 ends.

Figure 6:
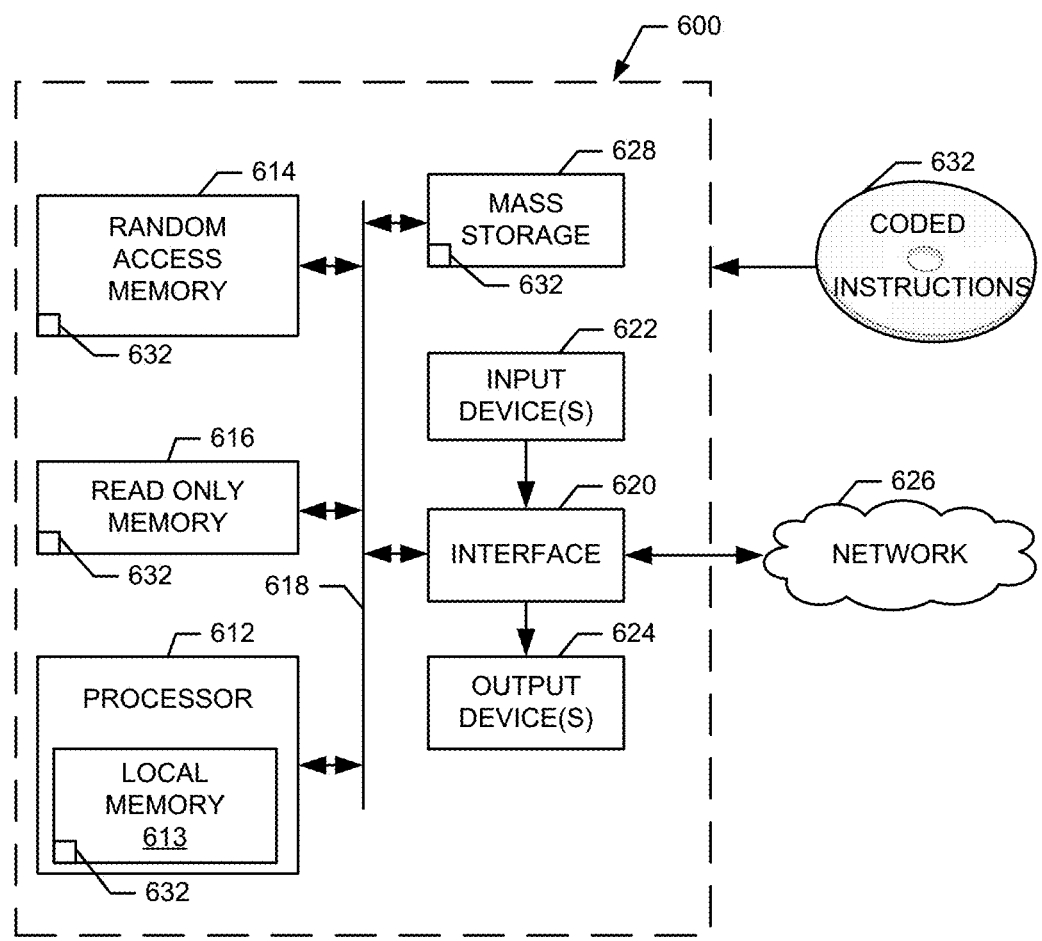
FIG. 6 is a block diagram of an example processor platform capable of executing the example machine readable instructions of FIGS. 4 and/or 5 to implement the example central facility of FIGS. 1 and/or 3.

FIG. 6 is a block diagram of an example processor platform 1000 capable of executing the instructions of FIGS. 4 and 5 to implement the central facility 114 of FIG. 2. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 4 and 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture provide a technique to track and/or determine the location of users in a vehicle. More particularly, this is accomplished by monitoring navigational voice cues output by a navigation system directing an operator of the vehicle. While GPS navigation systems are known and can be used to determine the location of a user, the examples disclosed herein improve upon such technology by being less intrusive in that the example methods and systems disclosed herein cannot pinpoint the exact location of the user at each moment. As a result, there is an increased likelihood that people may be willing to consent to be panelists and be monitored in this manner. Furthermore, the location tracking described herein has multiple beneficial applications. As described above, the determined location information can be used to determine the location of users in substantially real time to then provide advertisements, discounts, coupons, or other promotional offers associated with business(es) near the location of the users. Additionally or alternatively, in some examples, the location information can be provided to the business(es) to then target the users directly with advertisements. Further, the location information can be used to measure the exposure of users to outdoor advertisements based on the travel path followed by the users.

Although certain example methods, apparatus and articles of manufacture have disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   identifying, by executing an instruction with a processor, a route point designated by a navigational voice cue output by a navigation system providing directions to an operator of a vehicle; and
   determining, by executing an instruction with the processor, at least one of a location or an anticipated location of an occupant of the vehicle based on the route point.

2. The method of claim 1, further including:
   providing an advertisement to the occupant when the location or the anticipated location of the occupant is within a target area for the advertisement.

3. The method of claim 2, wherein the target area corresponds to at least one of a geographic region within a threshold distance of an address of a business, a road on which the business is located, a geographic region bounded by a set of roads, or a plurality of roads specified by the business.

4. The method of claim 2, further including providing the advertisement to the occupant via at least one of an email sent to the occupant, a text message sent to the occupant, or a website.

5. The method of claim 4, further including dynamically updating the website based on updated advertising information.

6. The method of claim 1, further including:
   identifying at least one of a road name, a second route point, or an intersection from a second navigational voice cue; and
   determining a travel path of the occupant based on the route point and the at least one of the road name, the second route point, or the intersection.

7. The method of claim 6, further including:
   comparing the travel path of the occupant to a location of an outdoor advertisement; and
   determining an exposure of the occupant to the outdoor advertisement based on the comparison.

8. The method of claim 1, further including:
   detecting an audio code in the navigational voice cue;
   identifying a city based on the audio code; and
   determining the location or the anticipated location of the occupant based on the city and the route point.

9. The method of claim 1, further including:
   receiving location data from a meter in the vehicle, the location data provided by the occupant to identify a city where the occupant is located; and
   determining the location or the anticipated location of the occupant based on the city and the route point.

10. A system comprising:
    an interface to receive in-vehicle audio data corresponding to audio output by a navigation system directing an operator of a vehicle, the in-vehicle audio data including a navigational voice cue;
    a speech analyzer to identify a route point from the navigational voice cue; and
    a location determiner to determine at least one of a location or an anticipated location of an occupant of the vehicle based on the route point.

11. The system of claim 10, further including an advertisement identifier to identify an advertisement for at least one of a product or a service offered by a business, the advertisement to be provided to the occupant when the location or the anticipated location of the occupant is within a target area for the advertisement.

12. The system of claim 11, wherein the target area corresponds to at least one of a geographic region within a threshold distance of an address of the business, a road on which the business is located, a geographic region bounded by a set of roads, or a plurality of roads specified by the business.

13. The system of claim 11, wherein the advertisement is provided to the occupant via at least one of an email sent to the occupant, or a text message sent to the occupant.

14. The system of claim 11, further including a website generator to generator a website to be accessed by the occupant, the website including the advertisement.

15. The system of claim 14, wherein the website generator is to dynamically update the website based on updated advertising information.

16. The system of claim 10, further including a travel path determiner to determine a travel path of the occupant based on the route point and at least one of a road name, a second route point, or an intersection identified from a second navigational voice cue.

17. The system of claim 16, further including an exposure analyzer to determine an exposure of the occupant to an outdoor advertisement based on a comparison of the travel path of the occupant to a location of the outdoor advertisement.

18. The system of claim 10, further including an audio code analyzer to detect an audio code in the navigation voice cue, the audio code to identify a city, the location determiner to determine the location or the anticipated location of the occupant based on the city.

19. The system of claim 10, wherein the location determiner is to determine the location or the anticipated location of the occupant based on location data input by the occupant.

20. A tangible computer readable storage medium comprising instruction that, when executed, cause a machine to at least:
    identify a route point designated by a navigational voice cue output by a navigation system providing directions to an operator of a vehicle; and determine at least one of a location or an anticipated location of an occupant of the vehicle based on the route point.

21. The storage medium of claim 20, wherein the instructions further cause the machine to:
provide an advertisement to the occupant when the location or the anticipated location of the occupant is within a target area for the advertisement.

22. The storage medium of claim 21, wherein the target area corresponds to at least one of a geographic region within a threshold distance of an address of a business, a road on which the business is located, a geographic region bounded by a set of roads, or a plurality of roads specified by the business.

23. The storage medium of claim 21, wherein the instructions further cause the machine to provide the advertisement to the occupant via at least one of an email sent to the occupant, a text message sent to the occupant, or a website.

24. The storage medium of claim 23, wherein the instructions further cause the machine to dynamically update the website based on updated advertising information.

25. The storage medium of claim 20, wherein the instructions further cause the machine to:
identify at least one of a road name, a second route point, or an intersection from a second navigational voice cue; and
determine a travel path of the occupant based on the route point and the at least one of the road name, the second route point, or the intersection.

26. The storage medium of claim 25, wherein the instructions further cause the machine to:
compare the travel path of the occupant to a location of an outdoor advertisement; and
determine an exposure of the occupant to the outdoor advertisement based on the comparison.

27. The storage medium of claim 20, wherein the instructions further cause the machine to:
detect an audio code in the navigational voice cue;
identify a city based on the audio code; and
determine the location or the anticipated location of the occupant based on the city and the route point.

28. The storage medium of claim 20, wherein the instructions further cause the machine to:
receive location data from a meter within the vehicle, the location data provided by the occupant to identify a city where the occupant is located; and
determine the location or the anticipated location of the occupant based on the city and the route point.

* * * * *